(12) United States Patent
Ziraknejad

(10) Patent No.: US 9,990,786 B1
(45) Date of Patent: Jun. 5, 2018

(54) VISITOR CREDENTIALS

(71) Applicant: MicroStrategy Incorporated, Vienna, VA (US)

(72) Inventor: Siamak Ziraknejad, Reston, VA (US)

(73) Assignee: MicroStrategy Incorporated, Vienna, VA (US)

( * ) Notice: Subject to any disclaimer, the term of this patent is extended or adjusted under 35 U.S.C. 154(b) by 529 days.

(21) Appl. No.: 14/598,482

(22) Filed: Jan. 16, 2015

Related U.S. Application Data

(60) Provisional application No. 61/928,663, filed on Jan. 17, 2014.

(51) Int. Cl.
  *G06F 21/00* (2013.01)
  *G07C 9/00* (2006.01)
  *G06F 21/45* (2013.01)

(52) U.S. Cl.
  CPC ......... *G07C 9/00103* (2013.01); *G06F 21/45* (2013.01)

(58) Field of Classification Search
  CPC ..... H04W 12/00; H04W 12/06; H04W 12/08; H04L 63/08; G06F 21/30; G06F 21/45; G07C 9/00007; G07C 9/00103
  USPC .......................................................... 726/6
  See application file for complete search history.

(56) References Cited

U.S. PATENT DOCUMENTS

| | | | |
|---|---|---|---|
| 7,770,206 B2 * | 8/2010 | Dillaway | G06F 21/33 726/2 |
| 8,219,814 B2 | 7/2012 | Elbury et al. | |
| 8,424,070 B1 | 4/2013 | Reeves et al. | |
| 8,848,919 B2 | 9/2014 | Le Saint et al. | |
| 9,397,980 B1 | 7/2016 | Chen | |
| 9,521,032 B1 * | 12/2016 | Worsley | H04L 41/00 |
| 2003/0163691 A1 * | 8/2003 | Johnson | H04L 29/06 713/168 |
| 2004/0131187 A1 * | 7/2004 | Takao | H04L 63/0428 380/255 |
| 2005/0015605 A1 | 1/2005 | Lin | |
| 2005/0257253 A1 * | 11/2005 | Ekers | G06K 19/07716 726/5 |
| 2006/0242410 A1 | 10/2006 | Aftab et al. | |
| 2007/0143826 A1 * | 6/2007 | Sastry | H04L 63/0492 726/2 |
| 2008/0261561 A1 | 10/2008 | Gehrmann | |
| 2010/0077467 A1 * | 3/2010 | Satagopan | G06F 21/335 726/7 |

(Continued)

*Primary Examiner* — Yogesh Paliwal
(74) *Attorney, Agent, or Firm* — Fish & Richardson P.C.

(57) ABSTRACT

A request is received by a member of a credential granting authority to issue an electronic visitor credential to a visitor of the credential granting authority, the electronic visitor credential enabling access to resources of the credential granting authority. It is determined that the member of the credential granting authority is authorized to issue the credential to the visitor. Based on the determination that the member of the credential granting authority is authorized to issue the credential to the visitor, the electronic visitor credential is issued with at least one timing restriction that defines a time period during which the electronic visitor credential is valid and at least one usage restriction that limits resources of the credential granting authority to which the electronic visitor credential enables access It is determined to withdraw the electronic visitor credential. Based on determining to withdraw the electronic visitor credential, the credential is withdrawn.

23 Claims, 25 Drawing Sheets

(56) References Cited

U.S. PATENT DOCUMENTS

| | | | |
|---|---|---|---|
| 2011/0296495 A1 | 12/2011 | Smeets | |
| 2012/0172026 A1* | 7/2012 | Kwon | H04L 63/067 |
| | | | 455/419 |
| 2012/0268243 A1* | 10/2012 | Kappeler | G07C 9/00031 |
| | | | 340/5.61 |
| 2012/0321084 A1 | 12/2012 | Le Saint et al. | |
| 2013/0309971 A1* | 11/2013 | Kiukkonen | H04L 63/107 |
| | | | 455/41.2 |
| 2014/0282929 A1* | 9/2014 | Tse | H04L 63/08 |
| | | | 726/5 |
| 2014/0331295 A1 | 11/2014 | Kumar et al. | |
| 2014/0373111 A1* | 12/2014 | Moss | H04W 12/08 |
| | | | 726/5 |

* cited by examiner

| Credential Granting Authority | Visitor | Sponsor | Start Time | End Time | Access Level |
|---|---|---|---|---|---|
| Organization 2 | John Adams | April Ford | 6/16/13 9AM | 7/16/13 5PM | Executive Profile |
| Organization 4 | Larry Smith | Leslie Jackson | 6/23/13 9AM | 6/23/13 5PM | Standard Profile |
| Organization 6 | Nancy Jones | Edward Johnson | 6/23/13 12PM | 6/30/13 3PM | Standard Profile |
| Organization 2 | Pat Washington | Organization 2 | 7/1/13 10AM | 7/3/13 5PM | Standard Profile |

FIG. 16

VISITOR CREDENTIALS

CROSS-REFERENCE TO RELATED APPLICATION

This application claims priority from U.S. Provisional Application No. 61/928,663, filed Jan. 17, 2014, and titled "Visitor Credentials," which is incorporated by reference.

TECHNICAL FIELD

This disclosure relates to visitor credentials.

BACKGROUND

Organizations may issue credentials to persons, for example, to uniquely identify each person. Persons may use the credentials to identify themselves and access resources provided by the organizations.

SUMMARY

In general, one innovative aspect of the subject matter described in this specification can be embodied in methods that include the actions of receiving, at a server system, a request by a member of a credential granting authority to issue an electronic visitor credential to a visitor of the credential granting authority, the electronic visitor credential enabling access to one or more resources of the credential granting authority; determining, by the server system, that the member of the credential granting authority is authorized to issue the electronic visitor credential to the visitor; based on the determination that the member of the credential granting authority is authorized to issue the electronic visitor credential to the visitor, issuing, by the server system, the electronic visitor credential with at least one timing restriction that defines a time period during which the electronic visitor credential is valid and at least one usage restriction that limits resources of the credential granting authority to which the electronic visitor credential enables access, the issuing including: storing, by the server system, visitor data for the electronic visitor credential that defines the at least one timing restriction and the at least one usage restriction, and sending, by the server system and to the visitor, data that enables usage of the electronic visitor credential; determining, by the server system, to withdraw the electronic visitor credential; and withdrawing, by the server system and based on determining to withdraw the electronic visitor credential, the electronic visitor credential. Other embodiments of this aspect include corresponding systems, apparatus, and computer programs, configured to perform the actions of the methods, encoded on computer storage devices.

These and other embodiments can each optionally include one or more of the following features. The action of determining that the member of the credential granting authority is authorized to issue the electronic visitor credential to the visitor includes determining that a timing restriction that defines a time period during which the member of the credential granting authority is authorized to issue the electronic visitor credential is satisfied. The actions further include determining that the member of the credential granting authority is authorized to issue the electronic visitor credential to the visitor includes determining that a geographic restriction that defines a geographic area where the member of the credential granting authority is authorized to issue the electronic visitor credential is satisfied.

The action of receiving the request includes receiving a request that specifies visitor information descriptive of the visitor to receive the electronic visitor credential; a start time that defines a time at which the electronic visitor credential becomes valid; an expiration time that defines a time at which the electronic visitor credential expires; and an access level that defines the one or more resources of the credential granting authority to which the electronic visitor credential enables access. The action of issuing the electronic visitor credential includes defining the at least one timing restriction based on the start time and the expiration time and defining the at least one usage restriction based on the access level. The action of sending the data that enables usage of the electronic visitor credential includes sending, to the visitor, notification of the issuing the electronic visitor credential.

The action of sending data that enables usage of the electronic visitor credential includes receiving an indication of direct interaction between the visitor and the member of the credential granting authority; and sending data that enables usage of the electronic visitor credential based on the indication of direct interaction between the visitor and the member of the credential granting authority. The direct interaction between the visitor and the member of the credential granting authority includes at least one of scanning, by a device of the visitor, a quick response code on a device of the member of the credential granting authority; and sending data through near field communication between the device of the visitor and the device of the member of the credential granting authority.

The action of sending data that enables usage of the electronic visitor credential includes sending, by the server system and to an email address associated with the visitor, data for retrieving the electronic visitor credential. The action of issuing the electronic visitor credential includes determining, by accessing user account data of the server system, that the visitor has an account; receiving an indication that a credential management application is installed on a device of the visitor; issuing the electronic visitor credential based on data from the account; and adding the electronic visitor credential to a list of credentials held by the visitor.

The action of issuing the electronic visitor credential includes determining, by accessing user account data of the server system, that the visitor has an account; receiving an indication that the a credential management application is not installed on the device of the visitor; sending data to prompt the visitor to install software for the credential management application on the device of the visitor; receiving data indicating that the software for the credential management application is installed on the device of the visitor; based on receiving data indicating that the software for the credential management application is installed on the device of the visitor, issuing the electronic visitor credential further based on data from the account; and adding the electronic visitor credential to a list of credentials held by the visitor.

The actions of issuing the electronic visitor credential include determining, by accessing user account data of the server system, that the visitor does not have an account; receiving an indication that a credential management application is installed on a device of the visitor; sending data to prompt the visitor to create an account with a credential management application; issuing the electronic visitor credential further based on data from the account; and adding the electronic visitor credential to a list of credentials held by the visitor.

The actions of issuing the electronic visitor credential includes determining, by accessing user account data of the server system, that the visitor does not have an account; receiving an indication that a credential management application is not installed on a device of the visitor; sending data to prompt the visitor to install software for the credential management application on the device of the visitor; receiving data indicating that the software for the credential management application is installed on the device of the visitor; based on receiving data indicating that the software for the credential management application is installed on the device of the visitor, sending data to prompt the visitor to create the account; receiving data indicating that the visitor created the account; issuing the electronic visitor credential further based on data from the account; and adding the electronic visitor credential to a list of credentials held by the visitor.

The action of sending data that enables usage of the electronic visitor credential includes sending an address that links to the electronic visitor credential. The action of issuing the electronic visitor credential includes including, in the electronic visitor credential, information stored in connection with a visitor's account. The information is stored in connection with the visitor's account includes a photo of the visitor and an employer of the visitor. The actions further include receiving data indicating attempted use of the withdrawn electronic visitor credential; and sending, for display on a device of the visitor, data indicating that the electronic visitor credential is withdrawn.

The action of withdrawing the electronic visitor credential includes requiring, from the member of a credential granting authority, data to renew the electronic visitor credential within a particular period of time from issuing the electronic visitor credential; determining that the data to renew the electronic visitor credential was not received within the particular period of time; and based on the determination that the data to renew the electronic visitor credential was not received within the particular period of time, withdrawing the electronic visitor credential. The action of determining, by the server system, to withdraw the electronic visitor credential includes determining that the visitor has engaged in inappropriate usage of the electronic visitor credential. The action of withdrawing the electronic visitor credential includes based on determining that the visitor has engaged in inappropriate usage of the electronic visitor credential, withdrawing the electronic visitor credential.

The action of determining, by the server system, to withdraw the electronic visitor credential includes receiving, by the server system and from the member of the credential granting authority, a request to withdraw the electronic visitor credential. The action of withdrawing the electronic visitor credential includes withdrawing the electronic visitor credential based on the received request to withdraw the electronic visitor credential. The action of determining, by the server system, to withdraw the electronic visitor credential includes determining that the electronic visitor credential has expired based on the at least one timing restriction. The action of withdrawing the electronic visitor credential includes withdrawing the electronic visitor credential based on the determination that the electronic visitor credential has expired.

In general, one innovative aspect of the subject matter described in this specification can be embodied in methods that include the actions of receiving, at a server system, a request by a member of a credential granting authority to issue an electronic visitor credential to a visitor of the credential granting authority, the electronic visitor credential enabling access to one or more resources of the credential granting authority; determining, by the server system, that the member of the credential granting authority is authorized to issue the electronic visitor credential to the visitor; based on the determination that the member of the credential granting authority is authorized to issue the electronic visitor credential to the visitor, issuing, by the server system, the electronic visitor credential with at least one timing restriction that defines a time period during which the electronic visitor credential is valid and at least one usage restriction that limits resources of the credential granting authority to which the electronic visitor credential enables access, the issuing including storing, by the server system, visitor data for the electronic visitor credential that defines the at least one timing restriction and the at least one usage restriction; identifying, by the server system, user account data stored in association with a visitor's account; associating, by the server system, user account data stored in association with a visitor's account with the electronic visitor credential; and sending, by the server system and to the visitor, data that enables usage of the electronic visitor credential; determining, by the server system, to withdraw the electronic visitor credential; and withdrawing, by the server system and based on determining to withdraw the electronic visitor credential, the electronic visitor credential. The action of determining that the member of the credential granting authority is authorized to issue the electronic visitor credential to the visitor includes accessing user account data for the member of the credential granting authority; and based on accessing the user account data for the member of the credential granting authority, determining that the member of the credential granting authority is authorized to issue the electronic visitor credential. Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of receiving, at a server system, a request by a member of a credential granting authority to issue an electronic visitor credential to a visitor of the credential granting authority, the electronic visitor credential enabling access to one or more resources of the credential granting authority; determining, by the server system, that the member of the credential granting authority is authorized to issue the electronic visitor credential to the visitor; based on the determination that the member of the credential granting authority is authorized to issue the electronic visitor credential to the visitor, issuing, by the server system, the electronic visitor credential with at least one timing restriction that defines a time period during which the electronic visitor credential is valid and at least one usage restriction that limits resources of the credential granting authority to which the electronic visitor credential enables access, the issuing including storing, by the server system, visitor data for the electronic visitor credential that defines the at least one timing restriction and the at least one usage restriction, and sending, by the server system and to the visitor, data that enables usage of the electronic visitor credential. Other embodiments of this aspect include corresponding systems, apparatus, and computer programs, configured to perform the actions of the methods, encoded on computer storage devices.

These and other embodiments can each optionally include one or more of the following features. The actions further include receiving data indicating that the visitor is attempting to access one of the one or more resources of the credential granting authority; determining that the electronic visitor credential grants access to the one of the one or more resources; and sending data to allow the visitor to access the one of the one or more resources. The action of receiving the request include receiving, at the server system, a request from a visitor for the electronic visitor credential; and sending, by the server system, data to the member of the credential granting authority to request the electronic visitor credential. The action of receiving the request includes receiving, at the server system, data indicating that the visitor has attempted to access one of the one or more resources of the credential granting authority; and sending, by the server system, data to the member of the credential granting authority to request the electronic visitor credential.

The details of one or more implementations are set forth in the accompanying drawings and the description, below. Other potential features of the disclosure will be apparent from the description and drawings, and from the claims.

BRIEF DESCRIPTION OF THE DRAWINGS

FIG. 16 illustrates an example of visitor data.

DETAILED DESCRIPTION

Techniques are described for using, creating, and managing visitor credentials. Within a credential management application, credential granting authorities can issue credentials to users. The credential granting authorities may also want to grant credentials on a more temporary basis. For example, a company that issues employee credentials that provide employees with access to company resources through the credential management application also may want to grant visitor credentials that grant visitors to the company with access to certain company resources while they are visiting the company through the credential management application. In some cases, these temporary credentials, or visitor credentials, may be more restrictive than a typical credential. For example, ABC Consulting may issue credentials to its employees. On any given day at ABC Consulting, various employees may host visitors. An employee who is hosting a visitor may issue the visitor a visitor credential so that the visitor may have access to various resources at ABC Consulting. The visitor credential may give the visitor access to keys to unlock doors certain doors within the ABC Consulting building, Wi-Fi access, logical access to particular file systems on ABC Consulting's network, and/or any other resources at ABC Consulting whose access is controlled using credentials. The visitor would only have access to these resources during the time that the visitor credential is valid (e.g., for the day on which the visitor is visiting ABC Consulting).

In some implementations, to issue a visitor credential through the credential management application, a credential holder may use the credential management application to select a visitor and to specify any restrictions on the visitor credential, such as a temporal restriction. The credential holder may email a visitor credential reference to the visitor or transfer the visitor credential reference through direct interaction between the credential holder's device and the visitor's device. The visitor receives the visitor credential reference and authenticates himself to authenticate the visitor to the credential management application. The credential management application sends the visitor credential to the visitor's device. The visitor can access the resources associated with the visitor credential until the visitor credential expires. Once the visitor credential expires, the visitor credential is withdrawn.

Figure 1:
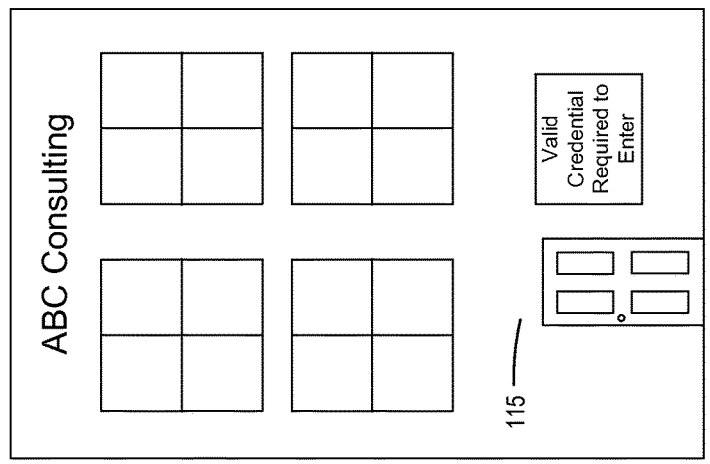
FIG. 1 illustrates an example use of visitor credentials.
Figure 1:
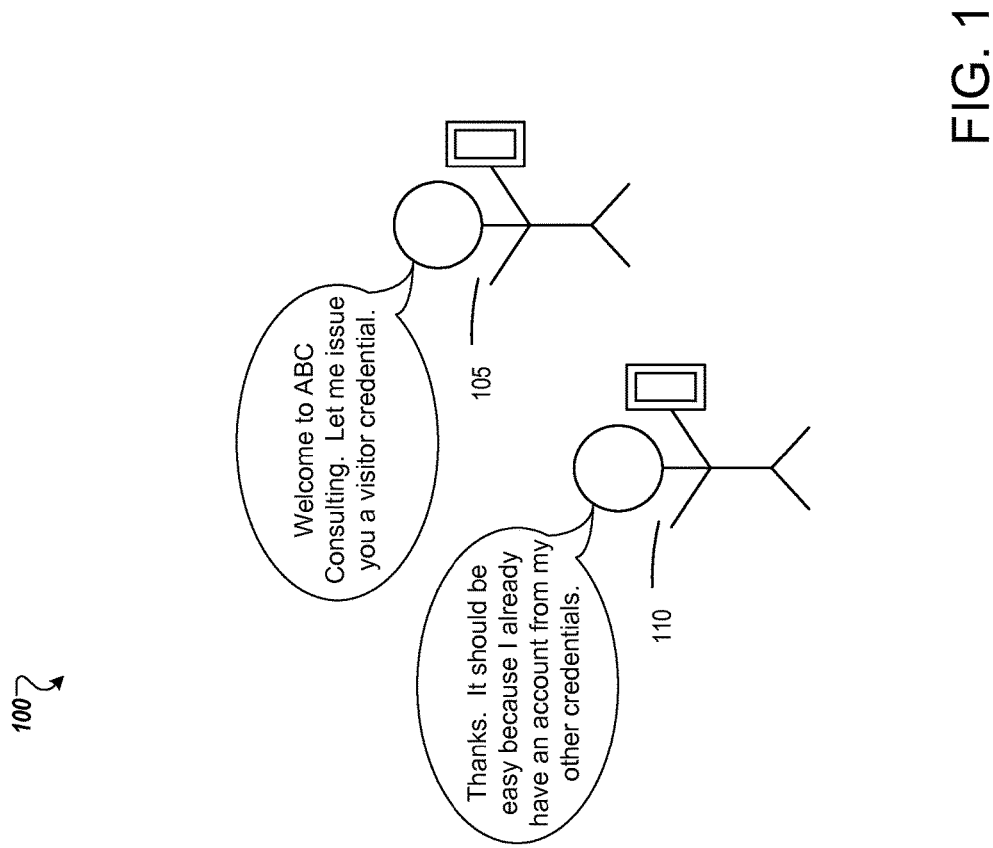

FIG. 1 illustrates an example use of visitor credentials. In the example shown in FIG. 1, an employee 105 of ABC Consulting is hosting visitor 110. ABC Consulting requires that anyone who enters door 115 have a valid credential. Employee 105 can issue a visitor credential to visitor 110 through a credential management application so that the visitor 110 can enter door 115. Visitor 110 has an account with the credential management application and has downloaded the credential management application to the visitor's device. Employee 105 can select the parameters for the visitor credentials. The parameters may include the start and end time for the visitor credential and the profile for the visitor credential. The profile defines the resources that are accessible to the visitor (e.g., door 115). The employee 105 specifics the visitor's email address to the credential management application. If the credential management application recognizes the visitor's email address, then the credential management application adds the visitor credential to the visitor's account. The credential management application may send an email to the visitor alerting the visitor that the visitor credential has been added to the visitor's account. Once the visitor credential has been added to the visitor's 110 account within the credential management application, the visitor 110 may use the visitor credential to enter door 115, provided, for example, the current time is within the temporal restrictions specified for the visitor credential. The visitor 110 may continue to use the visitor credential to access door 115 until the visitor credential expires and/or the visitor credential is withdrawn (e.g., by employee 105).

FIGS. 2-12 illustrate user interfaces for displaying information related to credentials. These interfaces may be displayed on a client device running a mobile credential management application. In these examples, the interfaces represent the user account of a user of the credential management application on a client device and may include credentials issued by one or more credential granting authorities.

Figure 2:
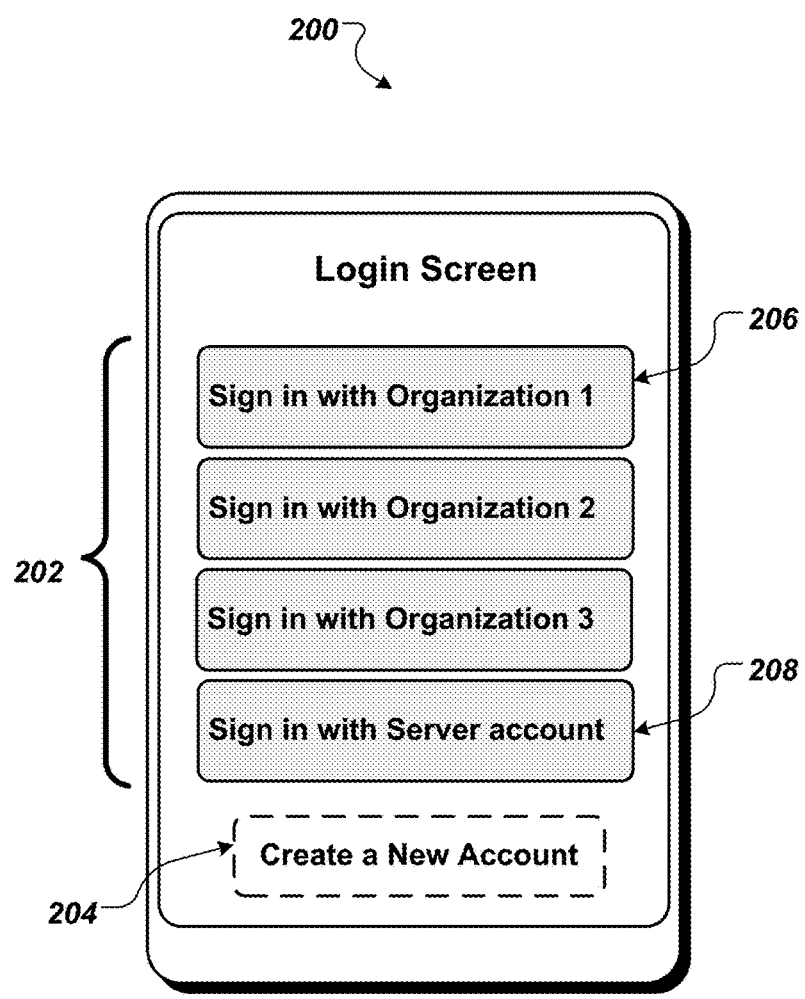
FIG. 2-14 are diagrams illustrating example user interfaces for displaying credentials and resources associated with credentials.

Referring now to FIG. 2, an example user interface 200 is shown that illustrates a list of options 202 for logging into the credential management application. The options 202 include different credential granting authorities that have issued credentials to the user such as Organization 1 as reflected in credential option 206. As shown in FIG. 2, Organization 2 and Organization 3 are reflected in option 208 and option 210, respectively, because Organization 2 and Organization 3 have issued credentials to the user. The options 202 also include a server option 212 that allows the user to log into the credential management application using an option provided by the credential management application. The user may select any of the options 202 to log into the credential management application. When the user selects one of the options 202, for example, option 208 corresponding to Organization 2, another user interface is displayed to the user (as described below in relation to FIG. 3), such as a dialog box, prompting the user to supply the user's authentication information for Organization 2 to log-in to the credential management application.

Figure 3:
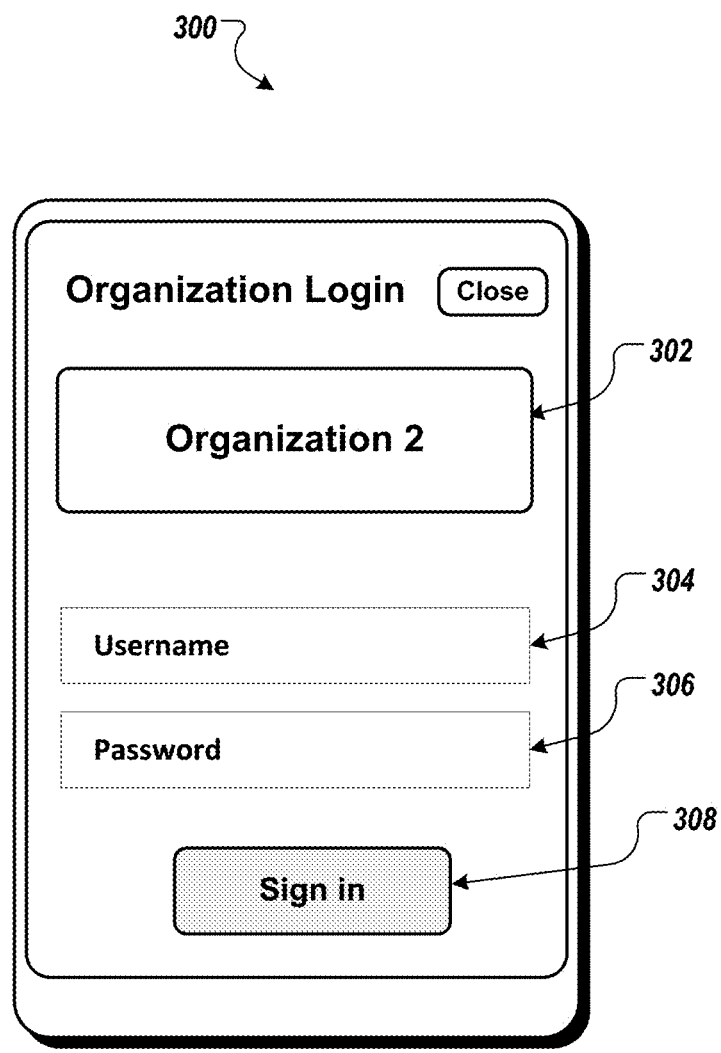

Referring now to FIG. 3, an example user interface 300 is shown that illustrates a log-in screen for a particular user to log into the credential management application. In this example, the user interface 300 provides a text display 302 indicating that the log-in corresponds to Organization 2 and thus the credential management application will authenticate the user using Organization 2's authentication information. Alternatively, the user may be redirected to authenticate himself directly with Organization 2. Once Organization 2 authenticates the user, Organization 2 may send a signal to the credential management application or to the user's device indicating that the user has been authenticated. The user interface 300 shows a log-in option in which the user can provide a user name and password that has been registered with Organization 2 by selecting button 304. In general, though, any suitable type of authentication information and authentication technique may be used.

For example, if the user wishes to access a credential issued by a university, the user may provide a voice login as authentication information. The authentication information required may be different depending on the credential issuing organization. The user may be able to provide as authentication information a user name and a password when logging into the credential management application using the login option provided by the university. Other login options provided by other credential granting authorities may request authentication information such as voice print, finger print, retina scan, etc. The authentication information may be confirmed either by a server hosting the credential management application, or by a server at the credential granting authority.

Regardless of which entity processes the user's authentication information and authorizes a user to log-in to the credential management application, the credential management application enables a variety of different credential granting authorities to issue mobile device-based credentials and/or keys through the credential management application. For example, FIG. 4 illustrates an example of a user's credentials issued by different organizations.

Figure 4:
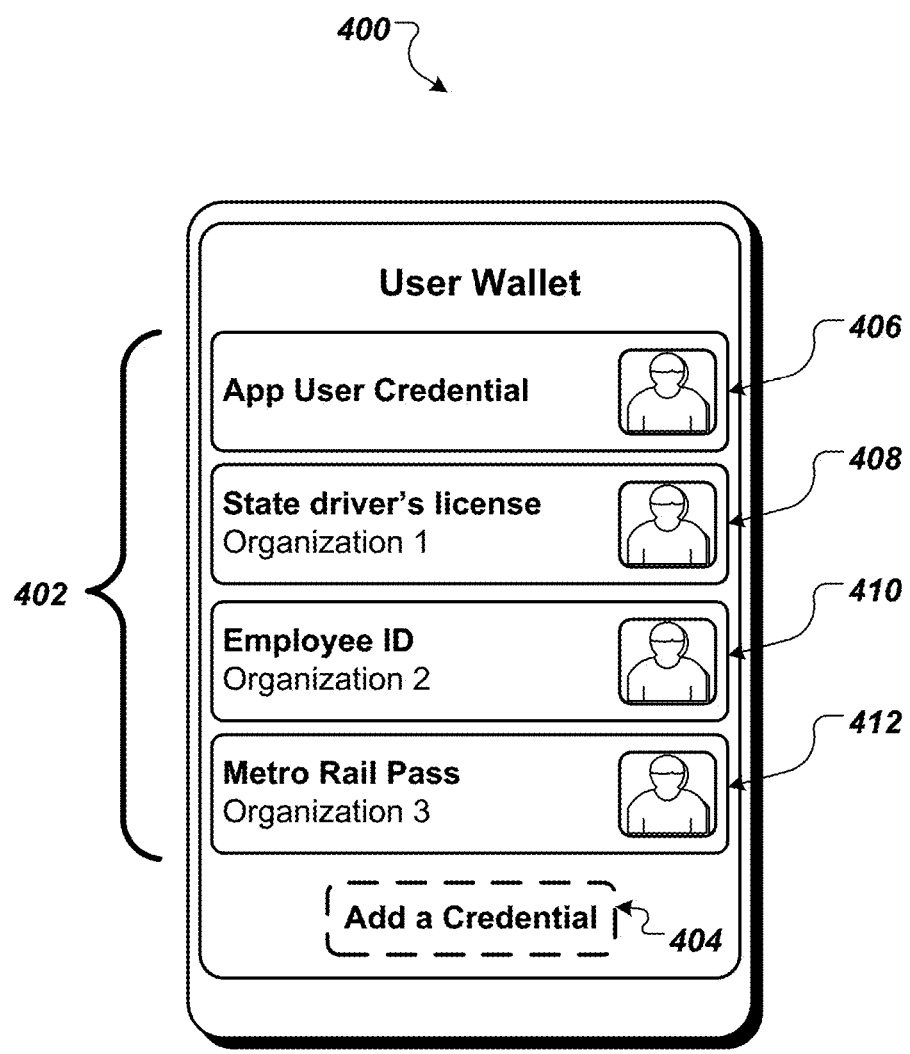

Referring now to FIG. 4, an example user interface 400 is shown that illustrates a collection of the credentials 402 held by a particular user. In this example, the user interface 400 shows four user credentials for the particular user corresponding to credentials issued to the user by different credential granting authorities. The user also may select the "Add a Credential" tab 404 to add new credentials issued to the user by credential granting authorities to the user's account.

In this example, the collection of credentials 402 includes four credentials Option 406 may be selected to access credentials issued by the server that hosts the credential management application. Another credential is a state-issued driver's license, selectable using option 308, issued by Organization 1, for which the user provided log-in information (e.g., using interface 300 in FIG. 3). Another credential is an employee ID, selectable using option 410, issued by Organization 2. The last credential is a metro rail pass, selectable using option 412, issued by Organization 3. The user may select one of the credentials to view the credential. For instance, when the user selects the Employee ID option 410 for Organization 2, the credential is displayed on the user's mobile device, as illustrated in FIG. 5.

Figure 5:
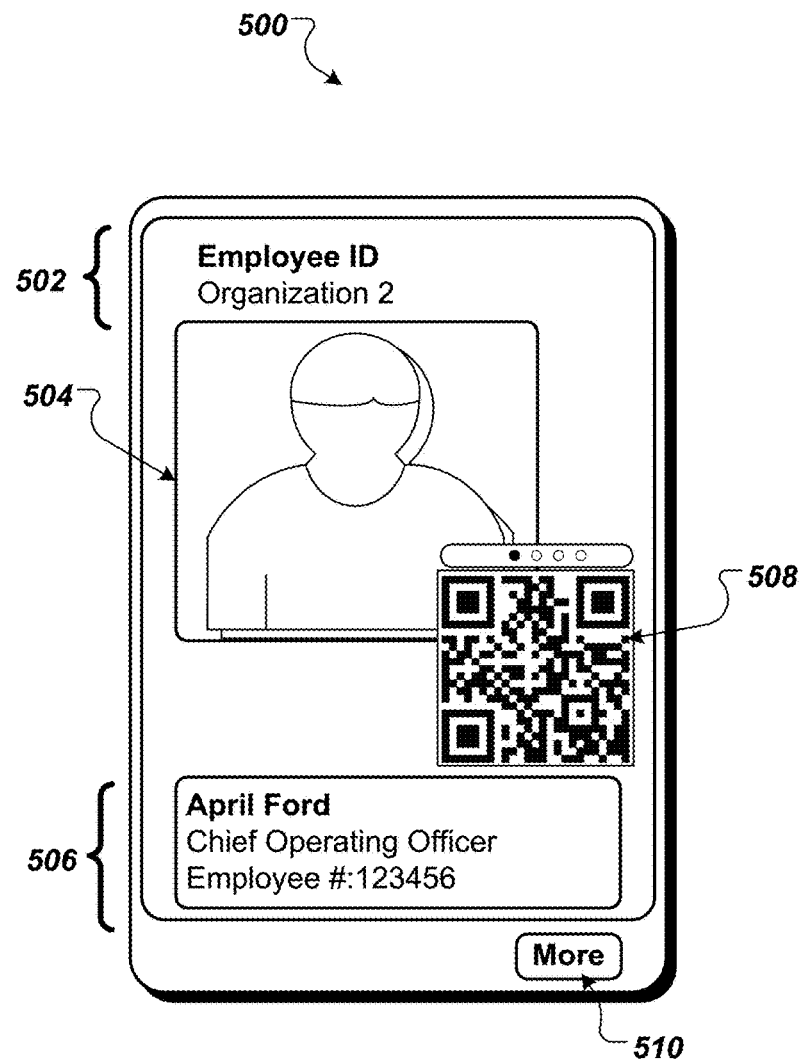

Referring now to FIG. 5, an example user interface 500 is illustrated that displays a selected credential. In this example, the selected credential is the employee ID credential that was selected using option 510 for Organization 2 in the user interface 400 of FIG. 4. The user interface 500 includes a description of the selected credential 502 and a picture 504 of the user that holds the credential. Also, the user interface 500 includes some personal information related to the credential holder 506. In some implementations, some or all of the information displayed in the user interface 500 may have been provided by the organization issuing the credential, Organization 2. The interface 500 also includes a validation mechanism 508. The validation mechanism 508 may be used for validation of the user's credential by other users or entities. In the example shown in FIG. 5, the validation mechanism 508 is a Quick Reference (QR) code. Another user or entity may use a validating device to image the QR code, extract credential information encoded within the QR code, and send the extracted credential information to the credential management system (or the credential granting authority) for validation. Validation confirms that the credential is a credential for the credential granting authority and that the credential may be used to access resources of the credential granting authority. For example, the user may present the validated credential to enter into door 115 from FIG. 1 to gain entry to the ABC Consulting building. The validated credential may be presented to a security guard or to an automated reader that unlocks door 115.

In some implementations, as an alternative or in addition to a QR code, the validation mechanism 508 may be an alphanumeric code and/or the validation mechanism 508 may be an indication that credential information is available for transmission using ultrasonic communications, near field communications (NFC), and/or other short-wavelength radio transmissions (e.g., in the ISM band from 2400-2480 MHz), for example, according to the Bluetooth standard. These communication channels may be used to present a code to a user or a device that the user can then use to validate the credential. The user interface 500 further includes a button 510 that causes additional information about the credential to be displayed. For instance, when the user selects the button 510, the user's mobile device displays the interface 600 illustrated in FIG. 6.

Figure 6:
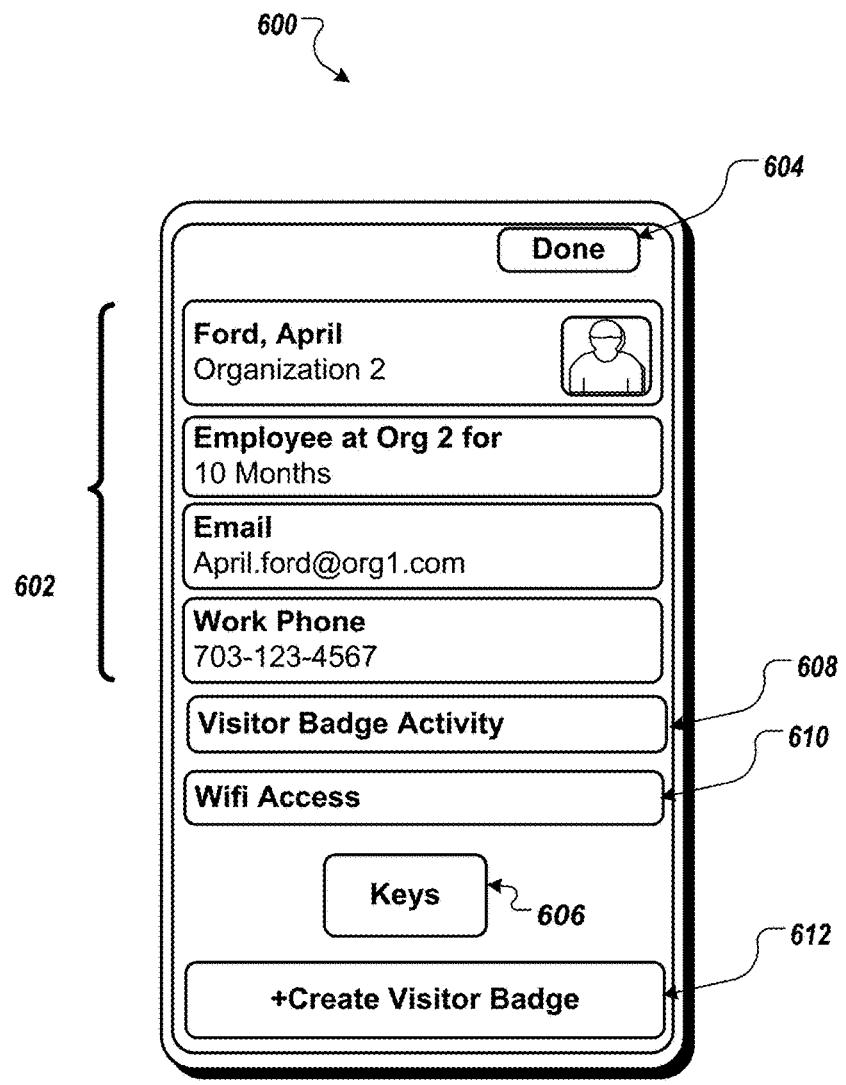

In some implementations, the user interface 500 represents a front of an employee badge and the interface 600 illustrated in FIG. 6 represents a back of the employee badge. In these implementations, when the user selects the button 510, an animation may occur that makes it appear as if the employee badge is being flipped from the front of the badge represented by the user interface 500 to the back of the badge represented by the interface 600 illustrated in FIG. 6.

Referring now to FIG. 6, an example user interface 600 is illustrated that displays additional information about a credential. In this example, the additional information corresponds to the selected credential illustrated in the user interface 500 of FIG. 5, corresponding to the employee ID of Organization 2. The interface 600 displays detailed information 602 that displays the name of the user and the name of the credential granting authority for the particular credential, the email address of the user, the length of time the user has held the credential, and the phone number of the user. Some or all of the detailed information 602 displayed about the credential may be provided by the organization issuing the credential, in this case Organization 2. The user interface 600 also includes a button 604 that causes the display to return to the front of the badge or the user interface illustrated in FIG. 5. The user interface 600 also may include a button 606 that causes the user's mobile device to display any keys that have been issued to the user, in connection with the credential displayed in user interfaces 500 and 600.

When a credential granting authority issues a credential to a user through the credential management application, it also may issue one or more keys to the user (e.g., for the purposes of providing access to one or more physical and/or logical resources controlled by the credential granting authority). For example, when Organization 2 issues an employee ID to the user, it also may issue a number of keys to the user that enable the user to unlock different doors within the Organization 2 office buildings, to gain access to certain floors of the buildings from the building's elevators, to enter/exit the parking garage, etc. In some implementations, the keys are associated with access control systems that regulate access to the physical and/or logical resources and enable the physical and/or logical resources to be locked or unlocked by invocation of a control within the credential management application on the user's mobile device.

Figure 7:
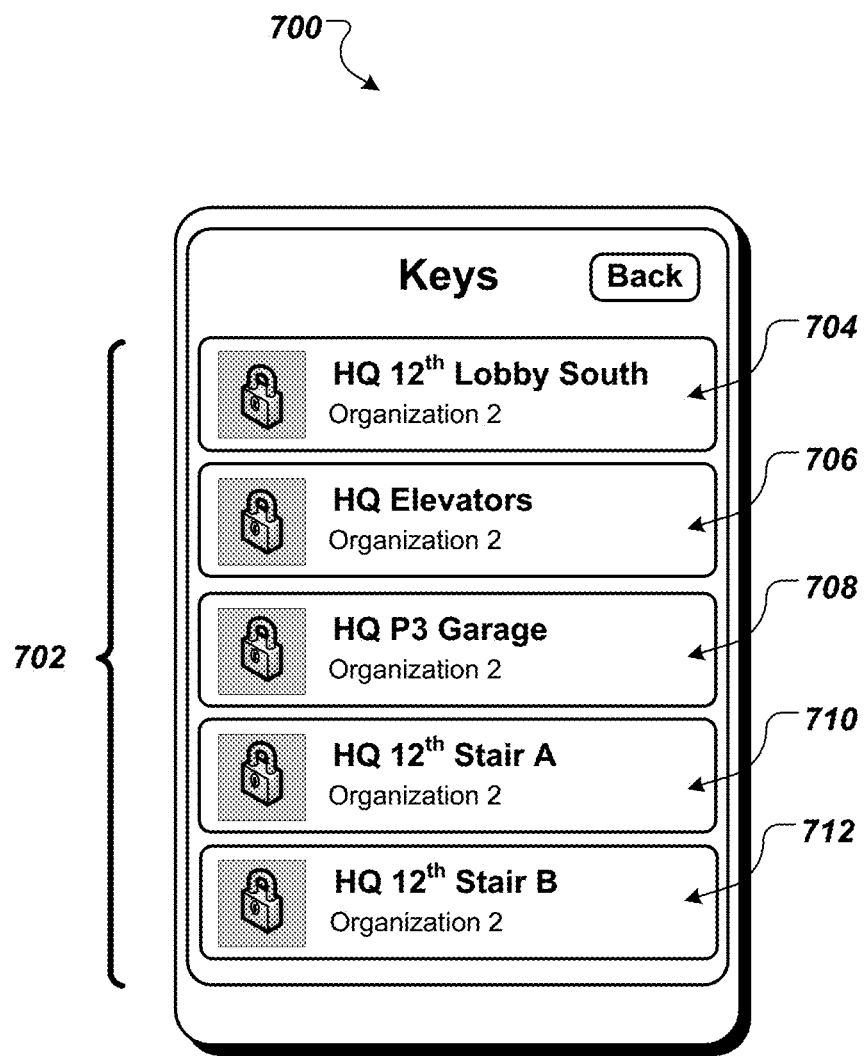

Various examples of different keys that an organization may issue to an employee as part of issuing the employee an employee credential through the credential management application are shown in FIG. 7.

Furthermore, in FIG. 6, the user interface 600 contains button 608. Button 608 allows the user to access an interface where the user may view any current visitor badges for visitors to Organization 2 that the user may be sponsoring. The user interface 600 also contains button 610. Button 610 allows the user to view the Wi-Fi networks that the user has access to as a consequence of possessing the employee badge issued by Organization 2. The user interface also contains button 612. As described in greater detail below, button 612 allows the user to create a new visitor badge for a visitor to Organization 2.

Referring now to FIG. 7, an example user interface 700 is illustrated that displays a list of keys associated with a credential. In this example, the user interface 700 shows a list 702 of five keys that have been issued to the user by Organization 2. The keys enable the user to access various physical resources that are controlled by Organization 2. The user also may select one of the keys to use or otherwise view details about the key. For instance, when the user selects the HQ 12th Lobby South key, selectable by option 704, information about the key is displayed on the user's mobile device, as illustrated in FIG. 8.

Figure 8:
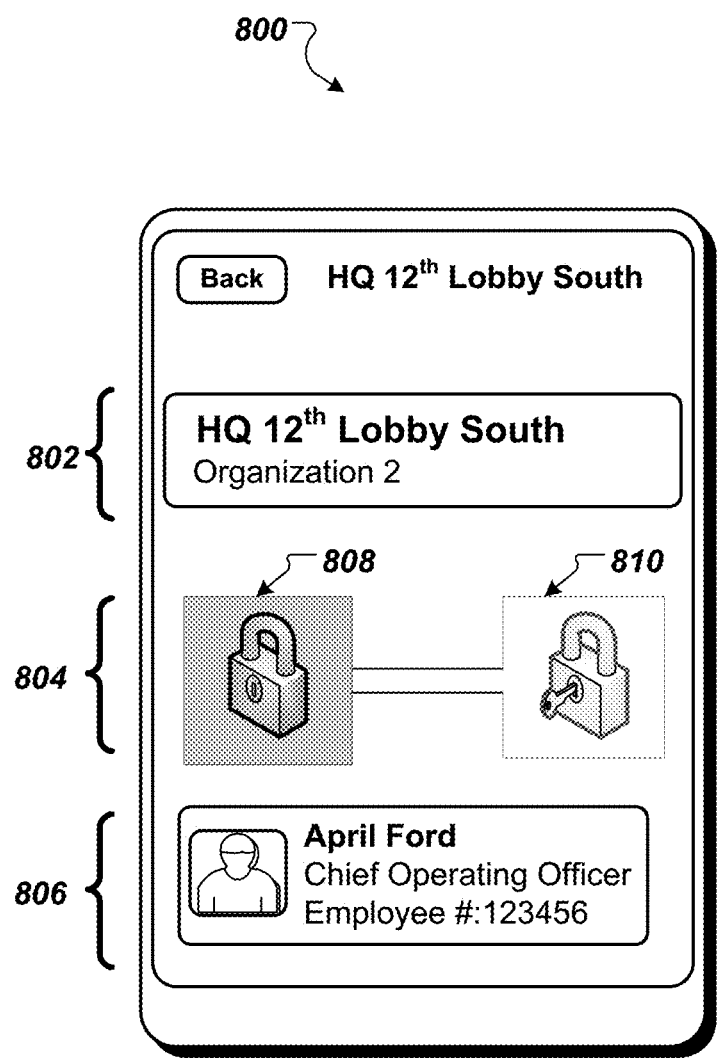

Referring now to FIG. 8, an example user interface 800 is illustrated that displays information about a selected key. The user interface 800 includes a text display 802 that describes the key and a slideable interface component 804 that enables the user to use the key to access a physical resource, in this case a door to the 12th-floor lobby of the Organization 2 headquarters. The interface 800 also may display information about the user in text display area 806. In this example, the user may use the key to access a physical resource by sliding the key-shaped icon in the slideable interface component 804 from a "locked" position 808 to an "unlocked" position 810. Other types of interface options may be presented by interface 800 for providing access to a physical resource using the key. In this example, when the user slides the slideable interface component 804 to the unlocked position 810, then a determination may be made as to whether the user is authorized to open the corresponding door, and, if so, the door opens and a confirmation message is displayed to the user, for example by presenting the interface 900 illustrated in FIG. 9. In some implementations, the determination that the user is authorized to open the door using the key is made prior to presenting the user with the list of keys (e.g., in user interface 700 of FIG. 7).

Figure 9:
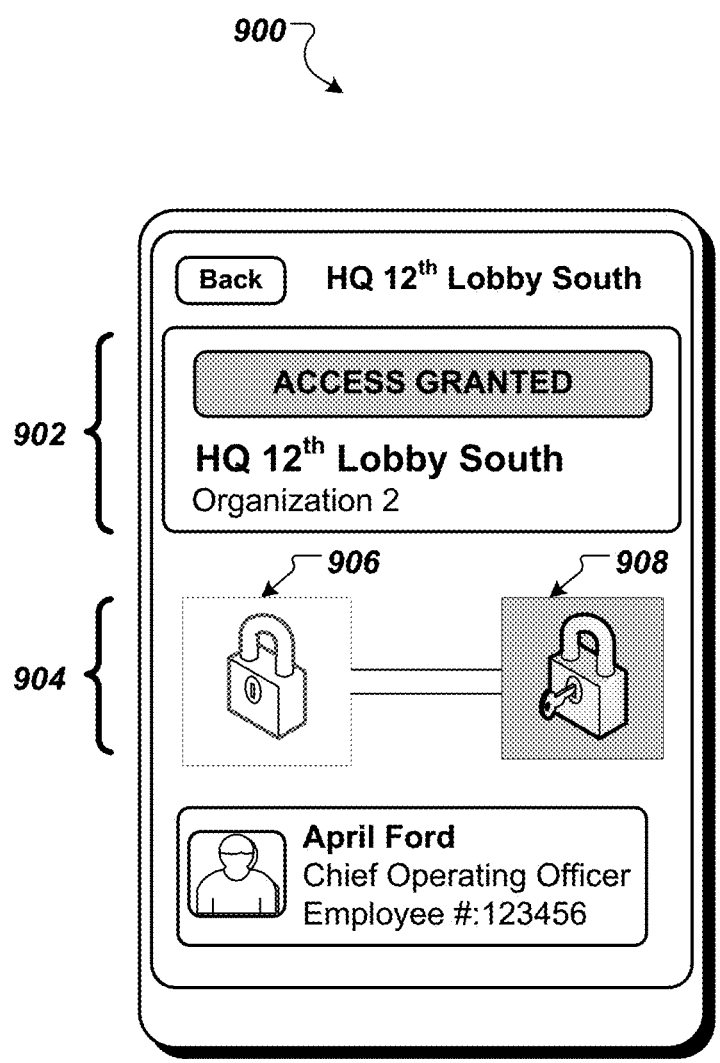

Referring now to FIG. 9, an example user interface 900 is illustrated that displays an indication that a physical resource has been unlocked using a key and is accessible to the user. In this example, a display interface component 902 may be provided indicating that Organization 2 has authorized the user to open the door to HQ 12th Lobby South.

The access of a physical resource using a key can be enabled by any suitable technique. For example, a user's mobile device may use short-range wireless communication signals, such as infrared (e.g., Bluetooth) or near-field communication (e.g., NFC) signals to access a physical resource by placing the mobile phone in close proximity to the physical resource. As another example, the mobile device may access a physical resource indirectly via an intermediate device, such as a relay or a router. Additionally or alternatively, the mobile device may use a wireless network communication signal (e.g., Wi-Fi, cellular, etc.), to access a physical resource over a communication network. For example, the mobile device may send control signals to the credential granting authority via wireless communication (either directly or via the server system), which may then, in turn, control the physical resource. More specifically, the mobile device may send an indication to the server that the user is attempting to access a key on the mobile device. The server may then determine whether the user is authorized to access the location that the user is attempting to access with the key. If the server determines that the user is authorized, then the server can send a signal to an access control system to grant access to the location. In some implementations, the mobile device may use an attached device, such as a dongle, to facilitate access of the physical resource. These are merely some examples of techniques that can be used by a mobile device to access a physical resource as a result of a user of the mobile device attempting to use a key to access the physical resource, and other techniques may be used.

Figure 10:
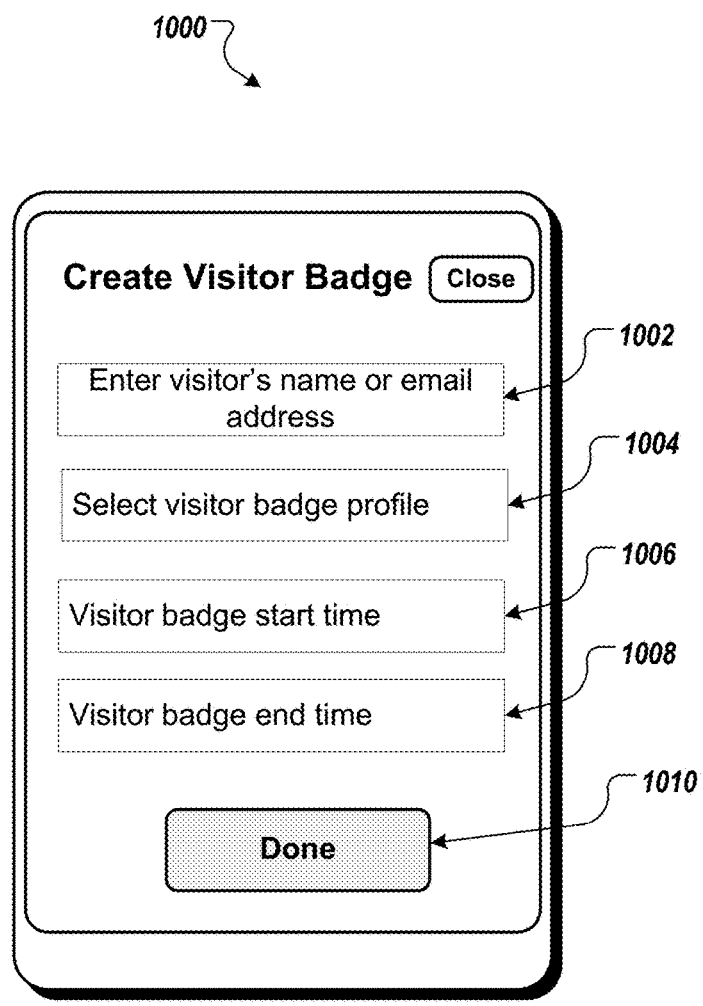

Referring now to FIG. 10, an example user interface 1000 is shown that illustrates fields for entering data to create a visitor credential. The user interface 1000 may have been reached by selecting button 612 in FIG. 6 for creating a visitor credential. For example, John Adams may have been visiting the credential holder April Ford of Organization 2. By selecting button 612, the credential holder notified the credential management application that she wanted to create a visitor credential. In turn, the credential management application displays the user interface 1000 for entering the details of the visitor credential.

The user interface 1000 contains different fields for entering information relating to the visitor credential. The user interface 1000 contains field 1002 for entering the visitor's name or email address and field 1004 for entering a profile for the visitor credential. The visitor's name may be associated with an email address by accessing contact information of the credential holder. For example, if the credential holder enters John Adams as the visitor's name, then credential management application may check the credential holders contacts to retrieve an email address. Alternatively, the credential holder may enter an email address directly into field 1002. The credential holder enters a profile for visitor credential. The profile determines the resources that will be available to the visitor. For example, an executive profile may allow the visitor access to the executive suite, while a standard profile may allow the visitor access to the resources of the typical employee of the credential granting authority. The credential holder enters the start time and end time in fields 1006 and 1008. These dates and times indicate when a visitor credential will be valid. Other options may be available when creating the visitor credential and will be described later. Once the credential holder had completed the fields, the credential holder selects the done button 1010. The button 1010 sends the entered data to the credential management application. Based on the visitor's email address and software installed on the visitor's device, the credential management determines how to issue the visitor credential to the visitor. Once the credential management application issues and stores the visitor credential, then the visitor credential appears in the visitor's wallet as shown in FIG. 11.

Figure 11:
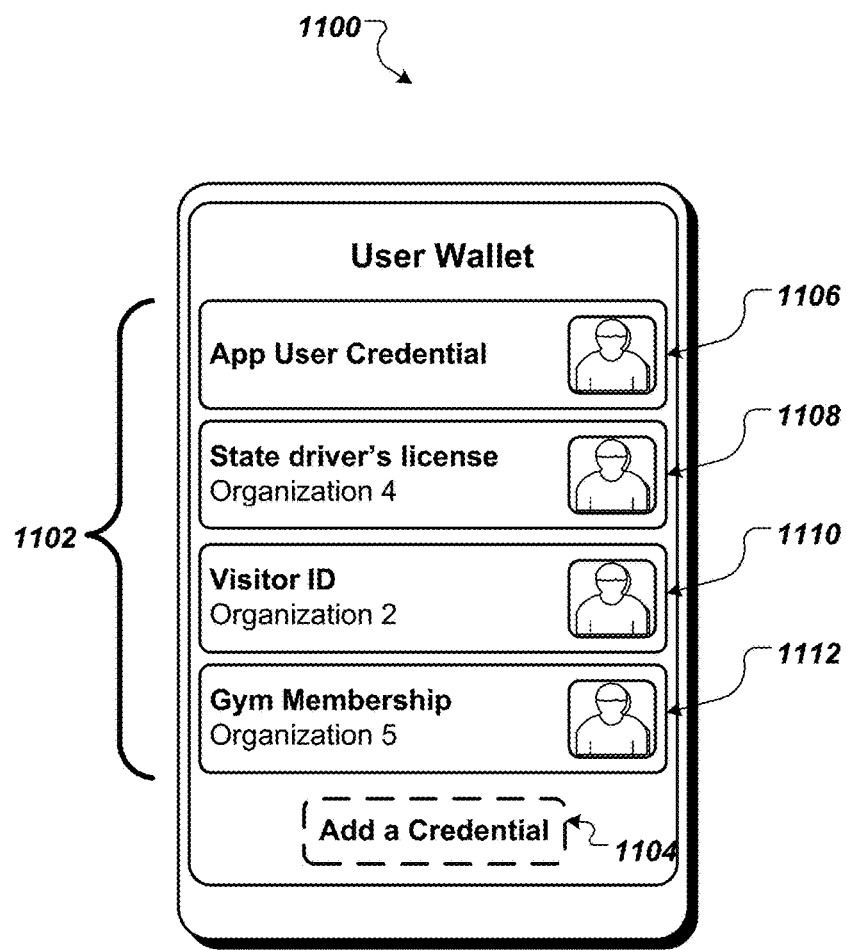

Referring now to FIG. 11, an example user interface 1100 is shown that illustrates a list of the credentials 1102 held by the visitor. In this example, the user interface 1100 shows four user credentials for the visitor, corresponding to different credential granting authorities. The visitor also may select the "Add a Credential" tab 1004 to add new credentials that have been issued to the visitor by different credential granting authorities to the visitor's account.

In this example, the list of credentials 1102 includes three credentials. Option 1106 may be selected to access credentials issued by the server that hosts the credential management application. Another credential is a state-issued driver's license, selectable using option 1108, issued by Organization 4. Another credential is the visitor ID, selectable using option 1110, issued by Organization 2. The last credential is a gym membership, selectable using option 1112, issued by Organization 5. The visitor may select one of the credentials to view the credential. For instance, when the visitor selects the visitor ID option 1110 for Organization 2, the credential is displayed on the visitor's mobile device, as illustrated in FIG. 12.

Figure 12:
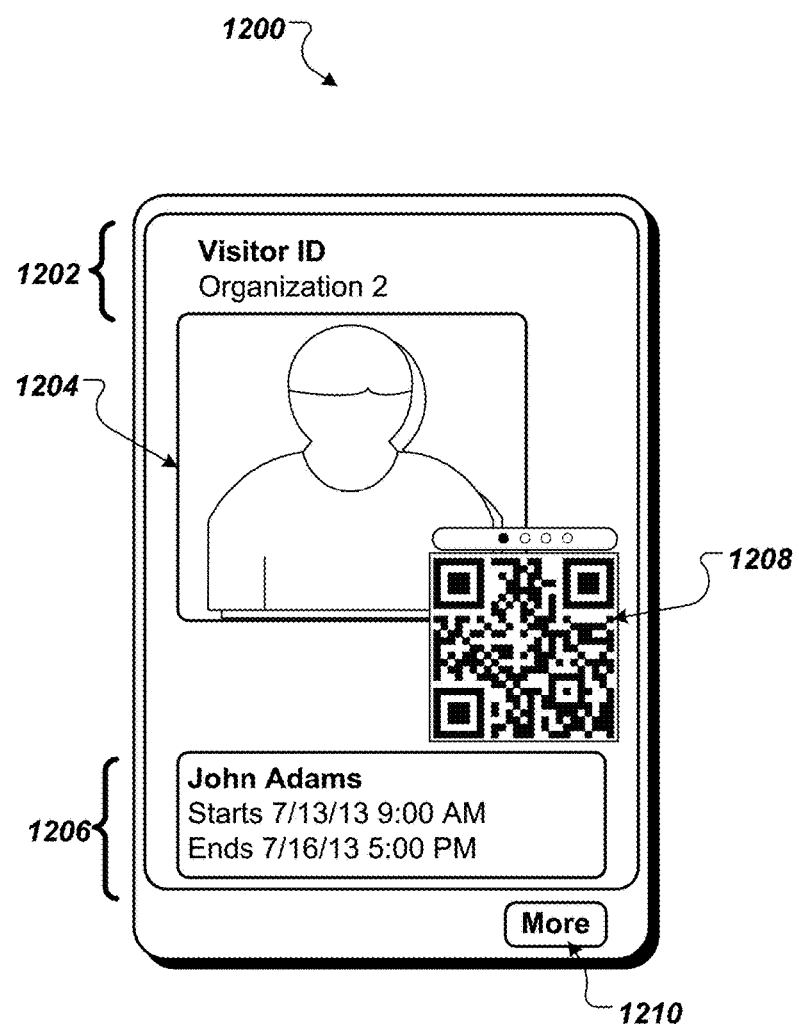

Referring now to FIG. 12, an example user interface 1200 is illustrated that displays the visitor credential. In this example, the visitor credential was selected using option 1110 for the visitor ID of Organization 2 in the user interface 1100 of FIG. 11. The user interface 1200 includes a description of the selected credential 1202 and a picture 1204 of the visitor that holds the visitor credential. Also, the user interface 1200 includes information 1206. Information 1206 may include the name of the visitor and the start and end times when the visitor credential is valid. In some implementations, some or all of the information displayed in the user interface 1200 may have been provided by the organization issuing the credential, Organization 2. In some implementations, some or all of the information displayed in the user interface 1200 may have been provided by the credential management application. For example, the visitor may have previous created an account with the credential management application. Upon creating the account, the visitor may have uploaded a picture of himself for use in the visitor's account. When the credential management application issues the visitor a visitor credential, the credential management application may check the account of the visitor to determine whether there is any information that the credential management application may use to complete the visitor credential. When the visitor's account contains a picture of the visitor, then the credential granting authority does not need to provide one, and the credential management application can issue the visitor credential with the visitor's picture. In other words, the credential management application inherits information from the visitor's account. The credential granting authority would need to provide the additional information such as visitor credential valid times, which were provided when the visitor credential was requested. The interface 1200 also includes a validation mechanism 1208. The validation mechanism 1208 may be used for validation of the visitor credential by other users or entities. In the example shown in FIG. 12, the validation mechanism 1208 is a Quick Reference (QR) code. Another user or entity may use a validating device to image the QR code, extract credential information encoded within the QR code, and send the extracted credential information to the credential management system (or the credential granting authority) for validation.

In some implementations, as an alternative or in addition to a QR code, the validation mechanism 1208 may be an alphanumeric code and/or the validation mechanism 1208 may be an indication that credential information is available for transmission using ultrasonic communications, near field communications (NFC), and/or other short-wavelength radio transmissions (e.g., in the ISM band from 2400-2480 MHz), for example, according to the Bluetooth standard. These communication channels may be used to present a code to a user or a device that the user can then use to validate the credential. The user interface 1200 further includes a button 1210 that causes additional information about the credential to be displayed. For instance, when the user selects the button 1210, the user's mobile device displays the interface 1300 illustrated in FIG. 13.

Figure 13:
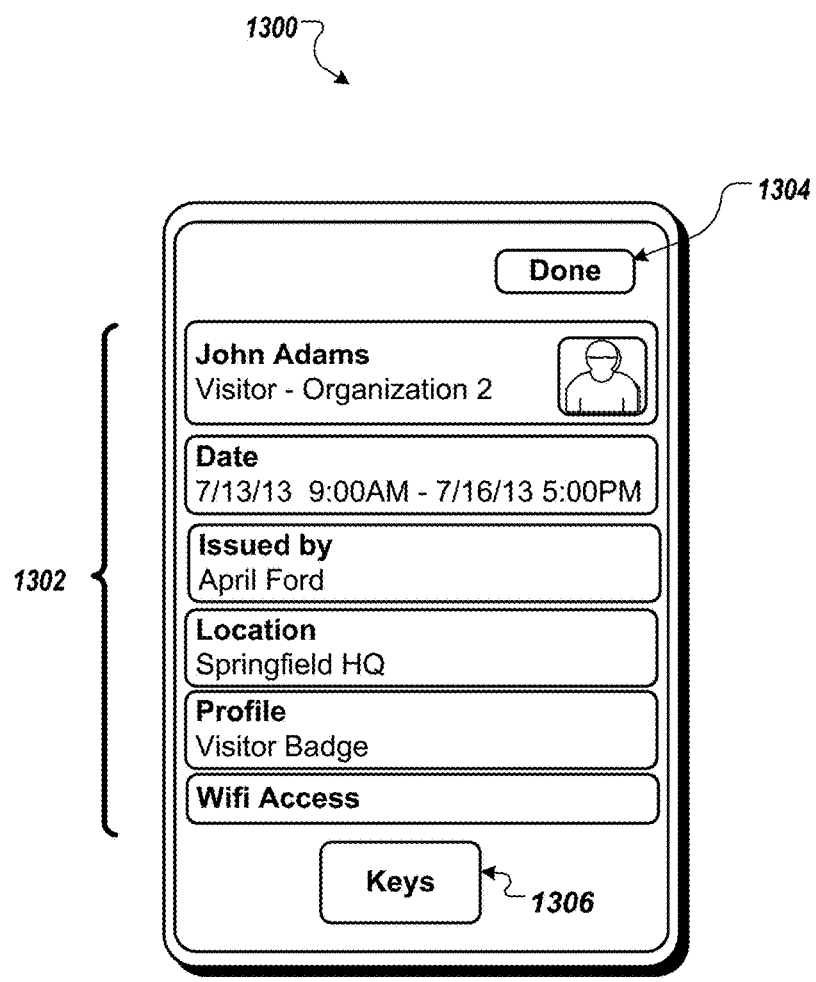

In some implementations, the user interface 1200 represents a front of an employee badge and the interface 1300 illustrated in FIG. 13 represents a back of the employee badge. In these implementations, when the user selects the button 1210, an animation may occur that makes it appear as if the employee badge is being flipped from the front of the badge represented by the user interface 1200 to the back of the badge represented by the interface 1300 illustrated in FIG. 13.

Referring now to FIG. 13, an example user interface 1300 is illustrated that displays additional information about a credential. In this example, the additional information corresponds to the selected credential illustrated in the user interface 1200 of FIG. 12, corresponding to the visitor ID of Organization 2. The interface 1300 displays detailed information 1302 that displays the name of the user and the name of the credential granting authority for the particular credential, the dates and times during which the visitor credential is valid, the sponsor of the visitor credential, the location of the office, the credential profile, and Wi-Fi networks that the visitor has access to by virtue of possessing the visitor credential. Some or all of the detailed information 1302 displayed about the credential may be provided by the organization issuing the credential, in this case Organization 2 or by the credential management application. The user interface 1300 also includes a button 1304 that causes the display to return to the front of the badge or the user interface illustrated in FIG. 12. The user interface 1300 also may include a button 1306 that causes the user's mobile device to display any keys that have been issued to the user, in connection with the credential displayed in user interfaces 1200 and 1300.

Figure 14:
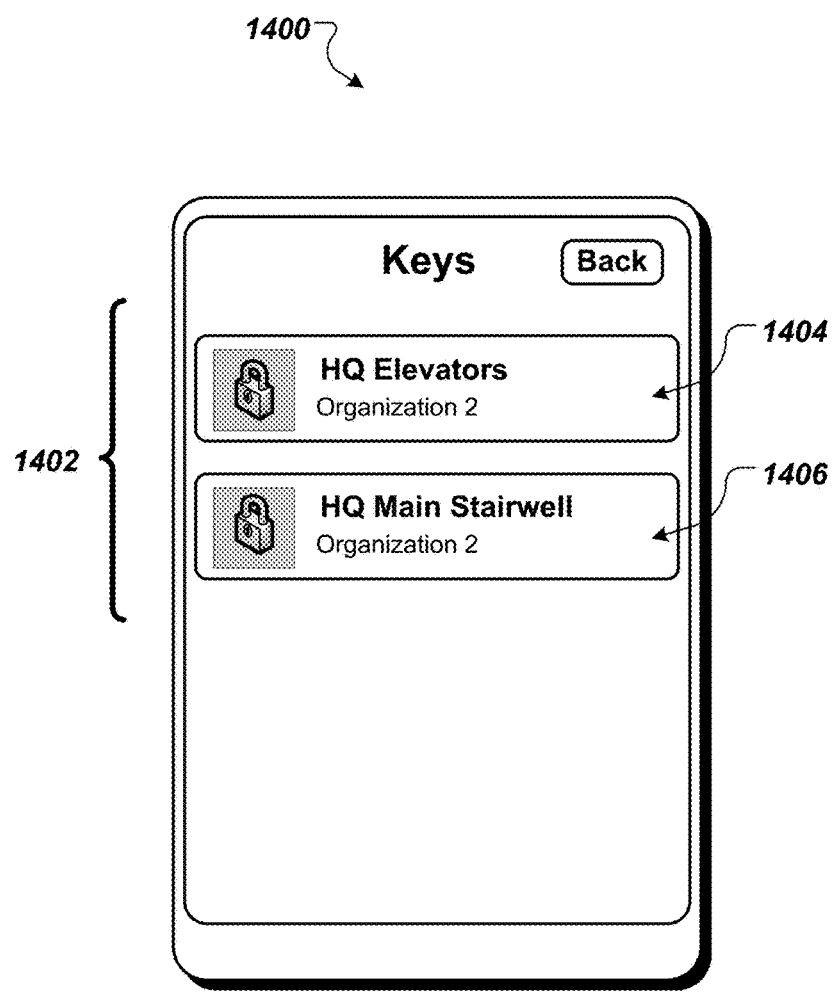

Various examples of different keys that an organization may issue to a visitor as part of issuing the visitor a visitor credential through the credential management application are shown in FIG. 14 and may be similar or different to the keys issued to an employee.

Referring now to FIG. 14, an example user interface 1400 is illustrated that displays a list of keys associated with the visitor credential. In this example, the user interface 1400 shows a list 1402 of two keys that have been issued to the visitor by Organization 2. The keys enable the visitor to access various physical resources that are controlled by Organization 2. The visitor also may select one of the keys to use or otherwise view details about the key. The keys shows in list 1402 are those that are associated with the visitor badge profile shown in FIG. 13. In this instance, the keys accessible to the visitor are not the same as those accessible in the employee credential of FIG. 7. In this example, the visitor has access to the HQ Elevators with key 1404 and the HQ Main Stairwell with key 1406.

Figure 15:
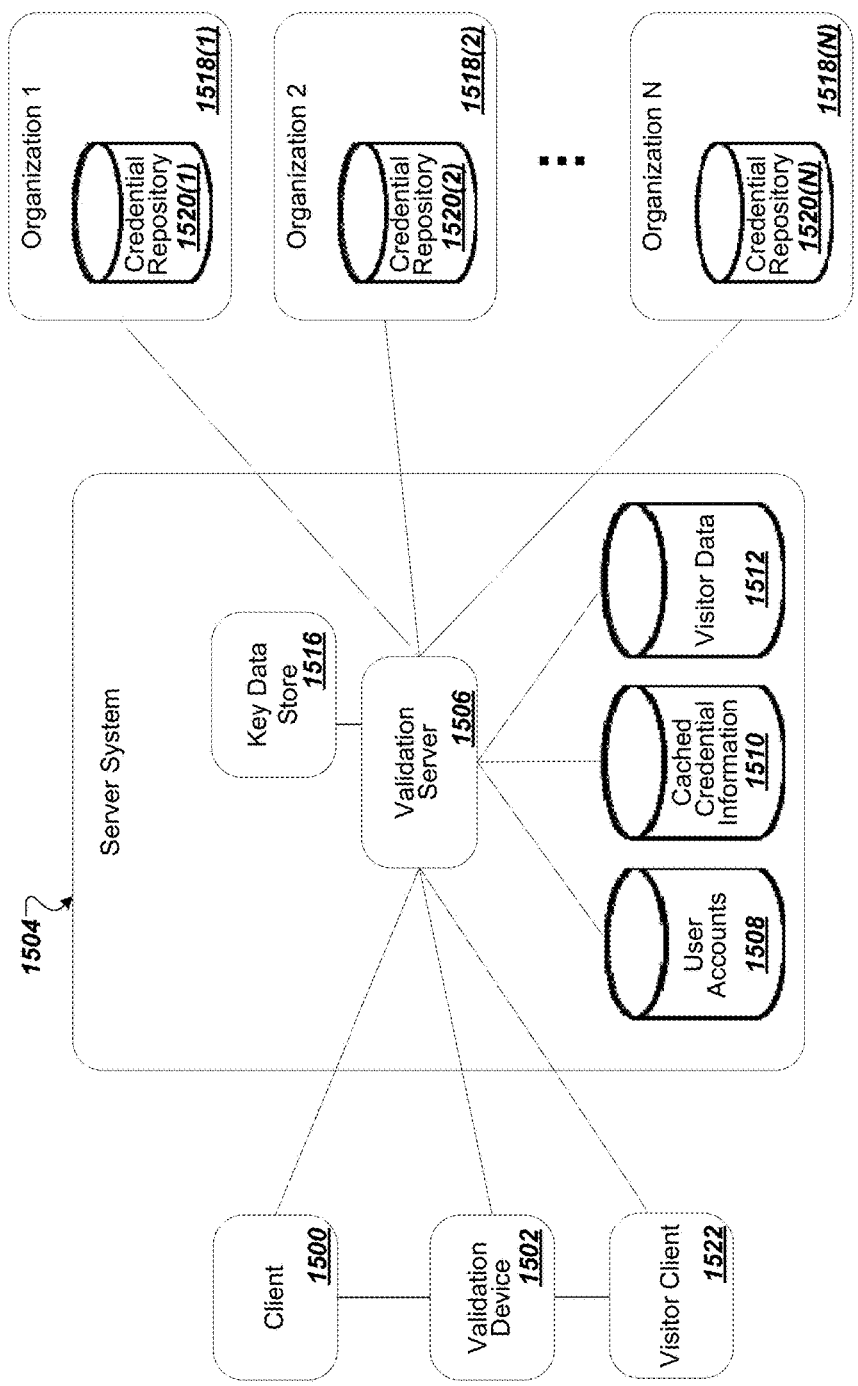
FIG. 15 is a block diagram illustrating an example of a credential managing system.

Referring now to FIG. 15, an example credential managing system is illustrated. In this example, the system includes a client device 1500, a validation device 1502, and a server system 1504. The client device 1500 operates a mobile device-based credential management application. The validation device 1502 may be any device that, for illustrative and exemplary purposes, is used to validate a credential and/or key of a user of client device 1500. The client device 1500 may include any electronic device that is capable of communicating with the server system 1504 including, but not limited to, a mobile phone, smart phone, personal digital assistant (PDA), electronic book (e-book) reader, tablet computer, laptop, or other device that includes one or more processors and non-transitory computer readable storage media. The credential management application that is installed on the client device 1500 is in communication with the server system 1504. The credential management application acts as a platform for managing credentials and related resources (e.g., keys) issued to multiple, different users by various credential granting authorities.

The server system 1504 includes a validation server 1506, a user account data store 1508, a credential data store 1510, a visitor data store 1512, and a key data store 1516. The validation server 1506 is involved in the process of validating credential granting authorities as well as the validation of credentials and/or keys. The validation server 1506 authenticates credential granting authorities that would like to make credentials and/or keys available to users of the credential management application. The validation server 1506 also validates credentials and/or keys held by users of the credential management system through communication with credential management applications operated on user devices, such as client device 1500.

The user account data store 1508 stores user account information, the credential data store 1510 stores credential information associated with user accounts, the visitor data store 1512 stores data relating to visitor credentials issued by credential granting authorities, and the key data store 1516 stores keys associated with the credentials. Users of the credential management application may set up a user account that allows the users to store personal information as well as the credentials and related resources (e.g., keys) issued to the user by different credential granting authorities. Each user account may include identification information for the user and credential/key data that defines credentials and/or keys held by the user. The server system 1504 may maintain accounts for multiple different users with each user account specific to a user, as well as maintain the credentials and/or keys held by the specific user.

FIG. 16 illustrates an example of visitor data 1600. The visitor data 1600 may be used by the server system 1504 to store visitor data for each of the multiple, different credential granting authorities that have issued visitor credentials for example in visitor data store 1512. The data in the visitor data 1600 may be provided to the server system 1504 by the different credential granting authorities.

The visitor data 1600 includes a credential granting authority column 1602. The credential granting authority column 1602 includes the name of the credential granting authority that issued the visitor credential. The name of the credential granting authority is provided to the server system 1504 when the server system receives the request for a visitor credential from the device of the individual requesting the visitor credential. In some implementations, the visitor data 1600 is segregated such that the server 1504 stores separate visitor data for each credential authority. For example, the server may store visitor data for Organization 1 in one location and in a separate location, may store visitor data for Organization 2.

The visitor data 1600 includes a visitor column 1605. The visitor column 1505 includes a name of the visitor. In some implementations, the name may be provided through an account that the visitor has with the credential management application or by the credential granting authority that issues the visitor credential. Where the name is provided by the credential granting authority, the member of the credential granting authority who requested the visitor credential may provide the name to the credential management application.

The visitor data 1600 includes a sponsor column 1610. The sponsor column 1310 includes the name of the sponsor or member who requested the visitor credential. The sponsor may be provided through the server system 1504 when the sponsor requests a visitor credential through the credential management application. In some implementations, the sponsor may be the name of a particular person. For example, if April Ford requested a visitor credential for John Adams, then the sponsor would be April Ford as shown in visitor entry 1630. In some implementations, the sponsor may be a name of a credential granting authority. For example, if an administrator for ABC Consulting requested a visitor badge for Pat Washington, then the sponsor may be ABC Consulting as shown in visitor entry 1645.

The visitor data includes a start time 1615 and an end time 1620. The start time 1615 and end time 1620 indicate the times during which the visitor credential is valid. For example, as shown in visitor entry 1635, the visitor credential for Larry Smith is valid from Jul. 23, 2013 at 9 AM to Jul. 23, 2013 at 5 PM.

The visitor data 1600 includes an access level 1625. The access level 1625 may define the resources that the visitor can access using the visitor credential while the visitor credential is valid. In some implementations, the access level 1625 may indicate a particular profile. For example, the access level 1625 may indicate an executive profile where the visitor can access resources similar to an executive with the credential granting authority. As another example, the access level 1625 may indicate a standard profile where the visitor can access resources similar to a regular employee with the credential granting authority. In some implementations, definitions for each profile may be stored elsewhere within the server. For example, a profile data store located within the server may store access information for each profile. Alternatively, the profile information may be stored an maintained by each credential granting authority. For example, the profile information for Organization 1 may be stored in system 1518(1). In either case, the server 1504 would access the profile information before authenticating the credential holder for access to a resource. In some implementations, the sponsor may not be able to request an access level for a visitor that is greater than the access level held by the sponsor. For example, a sponsor with a standard profile may not be able to request a visitor credential with an access level of the executive profile.

The validation server 1506 is in communication with the user account data store 1508, the credential data store 1510, the visitor data store 1512, and the key data store 1516, for example, to manage and validate credentials and related resources (e.g., keys). The validation server 1506 authenticates and establishes connections with various trusted credential granting authorities, such as Organization 1, Organization 2, . . . , Organization N that operate systems 1518(1), 1518(2), . . . , 1518(N), respectively, as shown in FIG. 1. The number of credential granting authorities N can be any suitable positive integer. The server system 1504 may use a variety of information and techniques to communicate with the credential granting authority systems 1518(1)-1518(N). For instance, the server system 1504 may use an electronic address (e.g., a uniform resource locator (URL)) to communicate with the credential granting authorities 1518(1)-1518(N) and a set of guidelines that govern a format for exchanging communications between the credential granting authority systems 1518(1)-1518(N) and the server system 1504.

As shown in FIG. 15, the validation server 1506 establishes multiple, different connections with multiple, different credential granting authority systems 1518(1)-1518(N). The credential granting authorities may include one or more universities, one or more companies, and one or more government agencies, among other types of credential granting authorities. One or more of the credential granting authority systems 1518(1)-1518(N) may maintain a credential repository (e.g., credential repositories 1520(1)-1520(N)) on systems 1518(1)-1518(N).

For example, the client device 1500 may attempt to use credentials and/or related resources (e.g., keys) from the credential granting authority system 1518(2), operated by Organization 2. The validation server 1506 sends a request to the credential granting authority system 1518(2) for credential information of a user of the client device 1500. The credential granting authority system 1518(2) accesses data from the credential repository 1520(2) and provides credential information from the accessed data to the validation server 1506. In some implementations, a credential granting authority system 1518(2) may transmit the credential information to the server system 1504 in a specific format specified by the server system 1504. For example, the credential granting authority system 1518(2) may transmit the credential information to the server system 1504 as a JavaScript Object Notation (JSON) object. Additionally or alternatively, the credential information may have certain fields to be filled by the credential granting authority system 1518(2) as specified by the server system 1504. The fields may include group name, user name, title of credential or badge title, expiration date, cache until date, and an extra field. The credential information also may include additional information. Such additional information may be communicated as encryption key-value pairs or it may be communicated as binary data or any other suitable data format. Additional information may include a photo of the user, or the logo of the credential granting authority.

After receiving the credential information from the credential granting authority system 1518(2), the server system 1504 may add one or more credentials and/or related resources (e.g., keys) to the user's account based on the received credential information. For example, the server system 1504 may identify an account associated with the user and associate, with the account, one or more credentials and/or keys defined by the credential information. In this example, the server system 1504 may store the credential information in association with the account of the user or the server system 1504 and may store other information representing the one or more credentials or keys defined by the credential information.

When a credential holder requests a visitor credential for a visitor, the server 1504 receives the request from the client 1500. The request contains the name of the visitor, the profile for the visitor credential and the start and end times for the visitor credential. The server 1504 stores the visitor credential in visitor data 1512. The data for the visitor credential is provided by the credential holder and by an account that the visitor has with the credential management application. The server 1504 adds the visitor credential to a list of credentials held by the visitor and gives the visitor access to those credentials on the visitor client device 1522. When the visitor client device 1522 tries to access a key or other resource associated with the visitor credential, the server receives a request from the visitor client device 1522. The server 1504 accesses the visitor data 1512 to determine if the visitor is permitted to access the requested resource. If the server 1504 determines that the visitor can access the resource, then the server 1504 sends a signal to grant access to the resource.

In some examples, after a credential and/or key is added to a user's account, the server system 1504 may sign the added credential and/or key and pass the added credential and/or key to the user device, where the added credential and/or key is displayed by the mobile credential management application with the list of credentials and/or keys associated with the account of the user. In these examples, some or all of the credential information for each of the credentials and/or keys associated with the account of the user is stored at the client device by the mobile credential management application. Accordingly, the mobile credential management application is able to display the list of credential and/or keys without communicating with the server system.

In some implementations, credential information is not stored at the client device and the user may be required to retrieve credentials and/or keys from the credential granting authority each time the user selects to view a list of credentials and/or keys. In these implementations, the user may be required to go through the entire authentication process each time the user selects to view the list of his/her credentials and/or keys.

In some examples, the server system 1504 may store cached versions of the credentials and/or keys and may retrieve credentials and/or keys from storage (e.g., from the cached credential data store 1510 or from the cached key data store 1516) to display when the user selects to view a list of credentials and/or keys at the mobile credential management application. In these examples, the mobile credential management application communicates with the server system 1504 to display the list of credentials and/or keys, but the user is not required to go through the entire authentication process to view the list of credentials and/or keys. Where a cached version of a credential and/or key is stored by the server system 1504, the server system 1504 may periodically request updated versions of the credential and/or key from the credential granting authority to ensure that the version of the credential and/or key that is displayed to the user is the most current version and that the credential and/or key has not been revoked by the credential granting authority.

Credentials and/or keys issued to a user by a credential granting authority may be cached (e.g., in the cached credential data store 1510 or in the cached key data store 1516) for a specified period of time (e.g., until a cache-until-date associated with the credential or key). The cache-until-date, for example, defines a date until which a cached version of the credential or key may be provided to the user without the server system having to communicate with the credential granting authority to confirm the continued validity of the credential or key. As an example, when the cache-until-date for a credential has not passed, the server system 1504 may access, from electronic storage at the server system 1504, a cached version of the credential and use the cached version of the credential to send the credential (e.g., send a user an updated list of the user's credentials) or validate the credential (e.g., confirm to another user that the user's credential is valid). When the cache-until-date for the credential has passed, the server system 1504 communicates with the credential granting authority that issued the credential to receive updated credentials. For example, an employer may define a cache-until-date corresponding to twenty-four hours from time of issuance for an employee credential issued to an employee by the employer. In this example, if the server system 1504 has received information for the employee credential from the employer's system less than twenty-four hours prior to the employee's attempted use of the credential (e.g., presentation of the credential to gain access to the employer's building), the server system 1504 may validate the use of the employee credential without having to communicate with the employer's system. If not, the server system 1504 communicates with the employer's system to receive updated credential information for the employee credential and validates the use of the employee credential based on the updated credential information for the employee credential.

Credentials and/or keys also may be associated with an expiration date. When a credential or key is associated with an expiration date, the credential or key may be stored by the server system 1504 until the expiration date. For instance, when the server system 1504 determines that the expiration date of a credential has passed, the server system 1504 may delete the data defining the expired credential and remove the expired credential from the user's account.

The server system 1504 may, in some implementations, refresh one or more credentials and/or keys for a user. For example, the server system 1504 may refresh a credential for any appropriate reason, such as in an effort to have an up-to-date version of the credential available to the client device through the credential management application. Refreshing a credential or key may include sending updated credential information to the client device 1500, which the client device 1500 may display and/or store. Refreshing one or more credentials or keys may occur based on actions taken by the user through the credential management application, such as providing input to display a current version of a particular credential or key or a current version of a list of credentials or keys held by the user. Credentials or keys stored on the client device 1500 also may be periodically refreshed (e.g., daily, weekly, etc.) by the server system 1504 so that the credential information stored on the client device 1500 is reasonably up-to-date.

There may be various different triggers that cause the server system 1504 to determine to refresh one or more credentials and/or keys. For example, in some implementations, the server system 1504 may determine to refresh a credential based on a cache-until-date associated with the credential expiring. For example, an employee badge may have a cache-until-date of one week. At the end of the week, the server system 1504 may determine to refresh the badge to determine if a newer version of the badge is available. Additionally or alternatively, the server system 1504 periodically may determine to refresh a credential or key to ensure that the credential or key still is valid and has not been revoked by the credential granting authority that issued the credential or key. The server system 1504 also may determine to refresh a credential or key in response to receiving a request to access the credential or key from the user to whom the credential or key was issued and/or in response to a request to validate the credential or key.

A user may add credentials and/or keys from more than one credential granting authority to his/her user account. For example, the user may wish to add a credential that confirms that the user received a degree from a University as well as an employee badge from his/her place of employment. In this example, the multiple credentials may be added in multiple, separate requests to add the credentials. In some implementations, a credential granting authority may provide several types of credentials to a user such that the user's account includes multiple, different credentials issued by the credential granting authority to the user. Additionally or alternatively, a user may receive credentials (and related resources, such as keys) from several different credential granting authorities such that the user's account includes at least a first credential (and related resources) issued by a first organization and a second credential (and related resources) issued by a second organization. The credential management system may maintain accounts for many different users, and may manage credentials and keys issued to these users by many different organizations.

Figure 17:
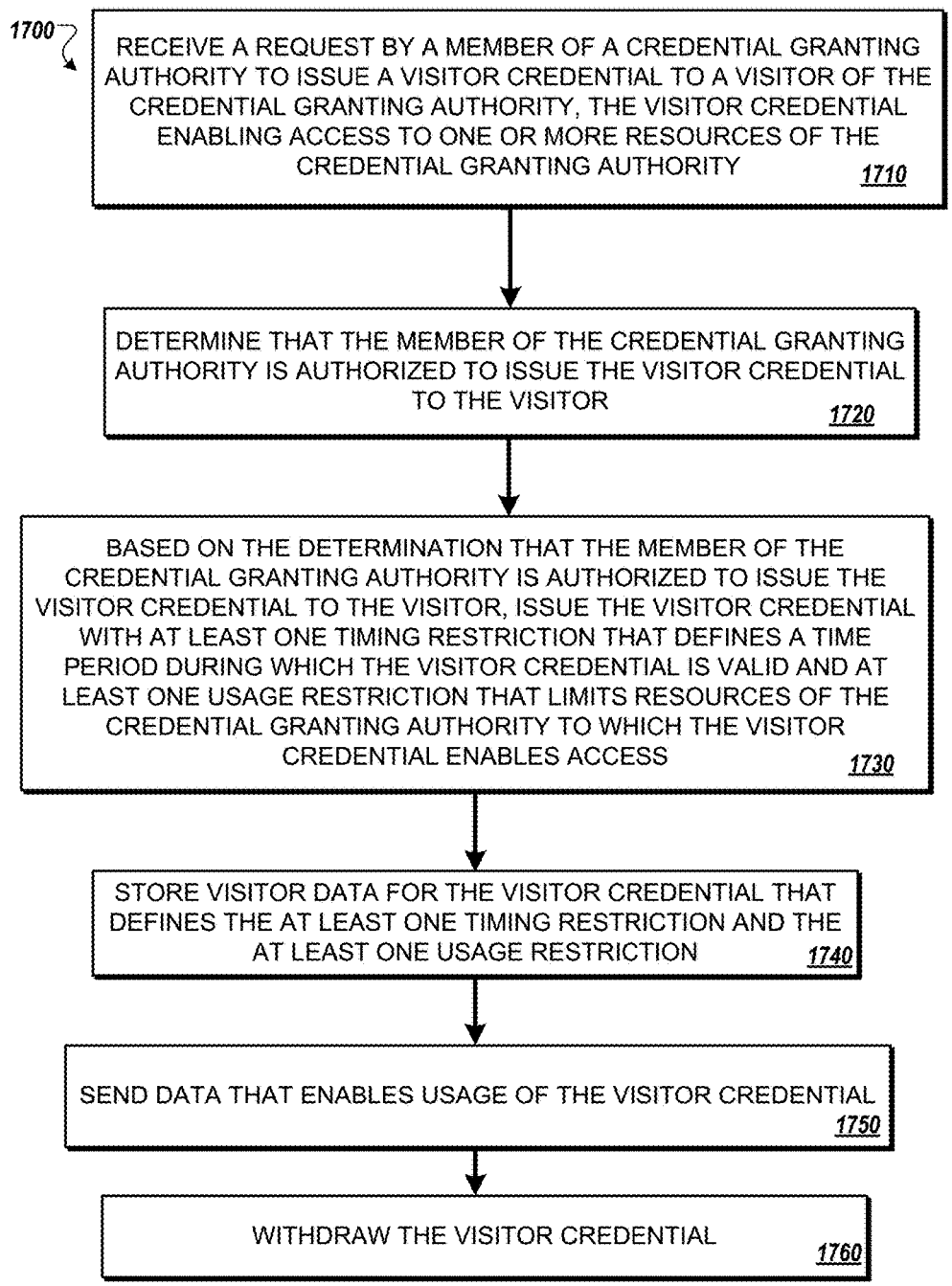
FIG. 17 illustrates an example process for managing visitor credentials.

FIG. 17 illustrates an example process 1700 for issuing a visitor credential. The operations of the process 1700 are described generally as being performed by the server 1504. The operations of the process 1700 may be performed by one of the other components of the system shown in FIG. 15 or may be performed by a combination of the components of the system shown in FIG. 15. In some implementations, operations of the process 1700 may be performed by one or more processors included in one or more electronic devices.

The server 1504 receives a request by a member of a credential granting authority to issue a visitor credential to a visitor of the credential granting authority (1710). For example, an employee of the credential granting authority may request that the credential granting authority issue a visitor credential to a visitor so that the visitor can unlock access doors in the building of the credential granting authority and/or so the employee can access a computing network associated with the credential granting authority. The request may include an identifier of the visitor (e.g., a name of the visitor, contact information for the visitor (e.g., an e-mail address, a phone number, etc., a start time when the visitor credential becomes valid, an end time when the visitor credential expires, and/or an access level that defines the resources accessible to the visitor.

In some implementations, the access level is defined by a profile that specifies one or more physical resources and/or one or more network resources to which the profile grants access. Examples of physical resources may be keys to open various doors. Examples of network resources may be Wi-Fi networks or particular parts of a file system. In some examples, the member may not be able to grant, to a visitor, access to resources to which the member does not have access. For instance, a member who does not have access to the West Wing of the building cannot grant access for a visitor to access the West Wing.

The server 1504 may make the visitor credential accessible by adding the credential to a list of accessible credentials that the visitor can access through the credential management application on the visitor's device. For example, the server 1504 may add the visitor credential to the visitor's wallet that the visitor can access on the visitor's device.

The server 1504 determines that the member of the credential granting authority is authorized to issue the visitor credential to the visitor (1720). In some implementations, only certain members of the credential granting authority (e.g., members with certain administrative privileges and/or members with a certain rank within the credential granting authority) may be authorized to issue visitor credentials. For example, the CEO of the credential granting authority may be able to issue visitor credentials, but a clerk of the credential granting authority may not be able to issue visitor credentials. In this example, the server 1504 compares an identity of the member requesting the issuance of the visitor credential with data that defines members that are authorized to issue visitor credentials and, based on comparison results, determines whether the member is authorized to issue the visitor credential. For instance, when the CEO requests the visitor credential, the server 1504 determines that the CEO is authorized to issue the visitor credential. When the clerk requests the visitor credential, the server 1504 determines that the clerk is not authorized to issue the visitor credential and denies the request.

In some implementations, the server 1504 determines if the visitor is allowed to receive a visitor credential. For example, a member who is authorized to issue visitors credentials may request a visitor credential for a visitor, but the server 1504 may determine that the visitor is blacklisted and, therefore, unable to receive a visitor credential. The server 1504 does not issue the visitor credential to the blacklisted visitor, even though the member is generally authorized to issue visitor credentials. A visitor may be blacklisted because the visitor attempted to access a resource when the visitor was not authorized to access the resource. For example, a visitor may have made repeated attempts to open a door even though the visitor did not have access to the door. A visitor may also be blacklisted because a member may have requested that the visitor not be issued a visitor credential. For example, if a member finds the visitor snooping around a building, then the credential holder may request through the member's device and stored in the server that the visitor not be granted a visitor credential.

In some implementations, the member may be able to issue visitors credentials during particular times but not during others. For example, the member may only be able to issue visitor credentials between 8:00 am and 6:00 pm, Monday through Friday. If the member requests a visitor credential at 8:30 am on Tuesday, then the server 1504 will grant the visitor credential. If the member requests a visitor credential on Saturday, then the server 1504 will not grant the visitor credential.

In some implementations, the member may be able to issue visitor credentials when located at particular locations but not when located at others. For example, the member may only be able to issue visitor credentials when the member is at Organization 2. If the member requests a visitor credential when the member is at Organization 2, then the server will grant the visitor credential. If the member is not at the Organization 2, then the server 1504 will not grant the visitor credential. Locations may be defined by a radius from a particular address or GPS coordinate, a range of addresses, or a range of GPS coordinates.

The server 1504 issues the visitor credential with at least one timing restriction, for example, that defines a time period during which the visitor credential is valid, and at least one usage restriction, for example, that limits resources of the credential granting authority to which the visitor credential enables access (1730). The server 1504 issues the visitor credential based on determining that the member is authorized to issue the visitor credential to the visitor. In some implementations, the usage restrictions may be based on the resources to which the member requested the visitor have access. For example, the member may have requested that the visitor have access to a standard profile that gives access to resources accessible to particular doors and particular portions of the network. In turn, the server 1504 restricts the visitor access to resources that standard credential holders have, such as access to doors of the bathrooms and main lobby. In some implementations, the timing restrictions may be based on the timing restrictions requested by the member when the member requested the visitor credential. For example, the member may request that the visitor credential be valid from Jul. 14, 2013 at 9:00 am to Jul. 17, 2013 at 5:00 pm. In some implementations, a visitor may only be able to use a visitor credential during particular hours within the broader timing restriction. For example, even though a visitor credential is valid from Jul. 14, 2013 at 9:00 am to Jul. 17, 2013 at 5:00 pm, the visitor may only be able to access the resources associated with the credential on Monday through Friday between the hours of 9:00 am and 5:00 pm each day.

The server 1504 stores visitor data for the visitor credential and specifies in the visitor data the timing restrictions and the usage restrictions (1740). The visitor data may be similar to the visitor data 1500 as shown in FIG. 15.

The server 1504 sends data to the visitor to enable usage of the visitor credential (1750). The server 1504 may send data to the visitor's device, such as, for example, the client 1500.

In some implementations, the server 1504 sends data to the visitor's device upon receiving an indication that the visitor's device has interacted with a device belonging to the member who requested the visitor credential. For example, the server 1504 may receive an indication that the visitor's device has scanned a quick response code. The quick response code may be located on the member's device. As another example, the server 1504 may receive an indication that the visitor's device has communicated with the member's device through near field communication. The member's device may transmit a reference to a visitor credential through the quick response code or though near field communication that visitor's device uses to authenticate the visitor's device to the server 1504 when receiving the visitor credential.

In some implementations, the server 1504 may send data to the visitor's device though email for retrieving the visitor credential. The member requesting the visitor credential may select to send the data through email, or the server 1504 may determine that sending the data through email is the most practical way to notify the visitor of the visitor credential. For example, the visitor may not have an account with the credential management application and thus the most practical way to deliver data to access the visitor credential is to email the visitor. In this example, the email would indicate that the visitor should install the credential management application to the visitor's device. Once the visitor installs the credential management application software to the visitor's device and creates an account with the credential management application, the server 1504 can add the visitor credential to a list of credentials accessible to the client.

In some implementations, the server 1504 sends a URL link to the visitor. The URL allows the visitor to access the visitor credential in a web browser. The visitor may print out the web browser and user the printed visitor credential. Alternatively, the visitor may access the URL each time the visitor wants to access resources of the visitor credential. In some implementations, the URL may be a link to add the visitor credential to the visitor's account. For example, if the server 1504 may have not added the visitor credential's account and selecting the link adds the visitor credential to the visitor's account. The URL may also be a link to download the credential management application to the visitor's device. The credential management application can dynamically update the URL based on the resources that the visitor is permitted to access at that particular time. For example, URL may include data to access particular doors if the URL is accessed at a time when the visitor credential has access to the particular doors.

The server 1504 withdraws the visitor credential (1760). The server 1504 may withdraw the visitor credentials for any number of different reasons including, for example, because the visitor credential expired, the issuing member requested withdrawal, the credential granting authority requested withdrawal, or the visitor engaged in inappropriate behavior. In some implementations, the server 1504 may require additional data to renew a visitor credential that is about to expire. If the server 1504 receives the required data, then the visitor credential does not expire. Alternatively, if the server 1504 does not receive the required data, then the visitor credential is allowed to expire. For example, a member may receive an indication that one of the visitor credentials that the member sponsored is about to expire. After checking with the visitor, the member determines that the visitor's credential should be extended. The member can then send a request to the server through the member's device to extend the visitor credential for a particular period of time.

In some implementations, the credential granting authority may set certain rules for visitor credential holders. For example, the credential holder may have to always be escorted by a trusted credential holder. The server 1504 may determine that the credential holder was away from a trusted credential holder for more than a period of time. The server 1504 may track the locations of credential holders using GPS or triangulation techniques. If the visitor was away from a trusted credential holder for more than a particular period of time, then the credential granting authority may withdraw the visitor credential. Alternatively, the credential granting authority may send a warning the first time a visitor engages in inappropriate behavior. If the credential granting authority has sent a particular number of warnings, the next time the visitor engages in inappropriate behavior, the credential granting authority may withdraw the visitor credential.

In some implementations, the server 1504 withdraws the visitor credential based on a request from the member issuing the visitor credential. This implementation will be discussed in more detail with respect to FIG. 23.

In some implementations, the visitor may attempt to use resources associated with an expired visitor credential. For example, a visitor may attempt to unlock a door at 6:00 pm using a visitor credential that expired at 5:00 pm. When a visitor attempts to use resources associated with a visitor credential after the visitor credential has expired, the server 1504 sends data indicating that the credential is expired to the visitor's device. The data may display on the visitor's device and indicate that the resource that the visitor is attempting to access is inaccessible because the visitor credential has expired. In some implementations, the server 1504 may send data to the member who issued the visitor credential that the visitor is attempting to use an expired visitor credential. For example, if a member issued a visitor credential to a visitor and, after the credential expired, the visitor attempted to open a door using the expired visitor credential, then the server 1504 may send a message or alert to the member indicating that the visitor attempted to access an expired credential. The server 1504 may present the member with an option to renew the visitor credential or dismiss the alert.

Figure 18:
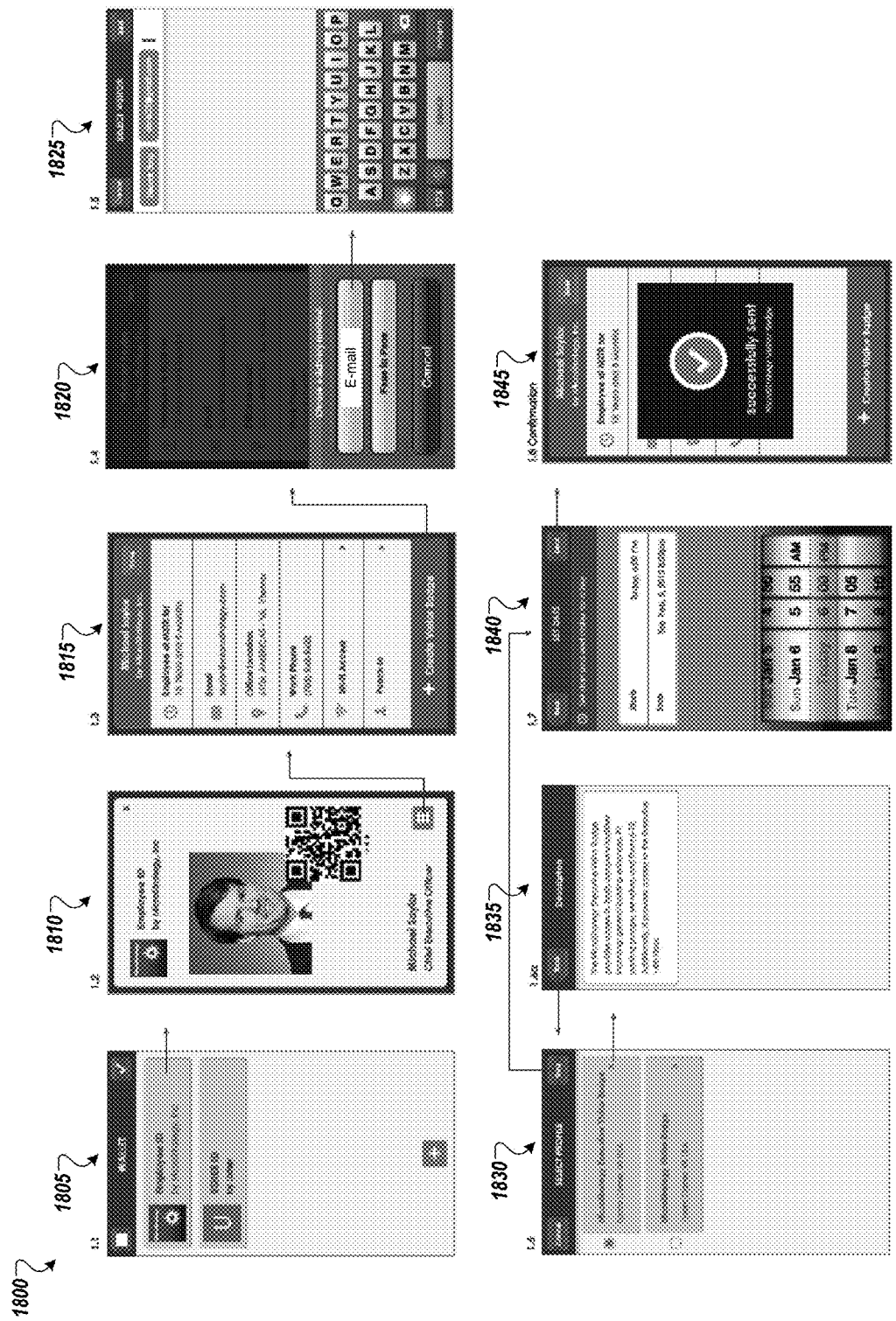
FIGS. 18 and 23 illustrate example sets of screen shots for issuing a visitor credential.

FIG. 18 illustrates an example set of screen shots 1800 for issuing a visitor credential. The set of screen shots 1800 illustrates the process for issuing a visitor credential through e-mail as performed on a client device such as a mobile phone.

The member issuing the visitor credential access the credential management application and views the member's wallet in screen 1805. The member selects the credential that is associated with the desired visitor credential. For example, if the member wants to issue a visitor credential for Organization 2, then the member selects the member's Organization 2 credential. The member navigates to screen 1815 and selects the create visitor badge button. In screen 1820, the member selects to send data to access the visitor credential to the visitor using e-mail. The member drafts the e-mail and selects one or more visitors to whom to send the visitor credential. In screen 1830, the member selects one of the pre-defined visitor profiles. In this example, there are two pre-defined visitor profiles, the executive profile and the regular profile. The member may view a description of a selected profile in screen 1835 and set up start and end times in screen 1840. Once the member sends the visitor profile, the confirmation screen 1845 appears on the member's device.

Figure 19:
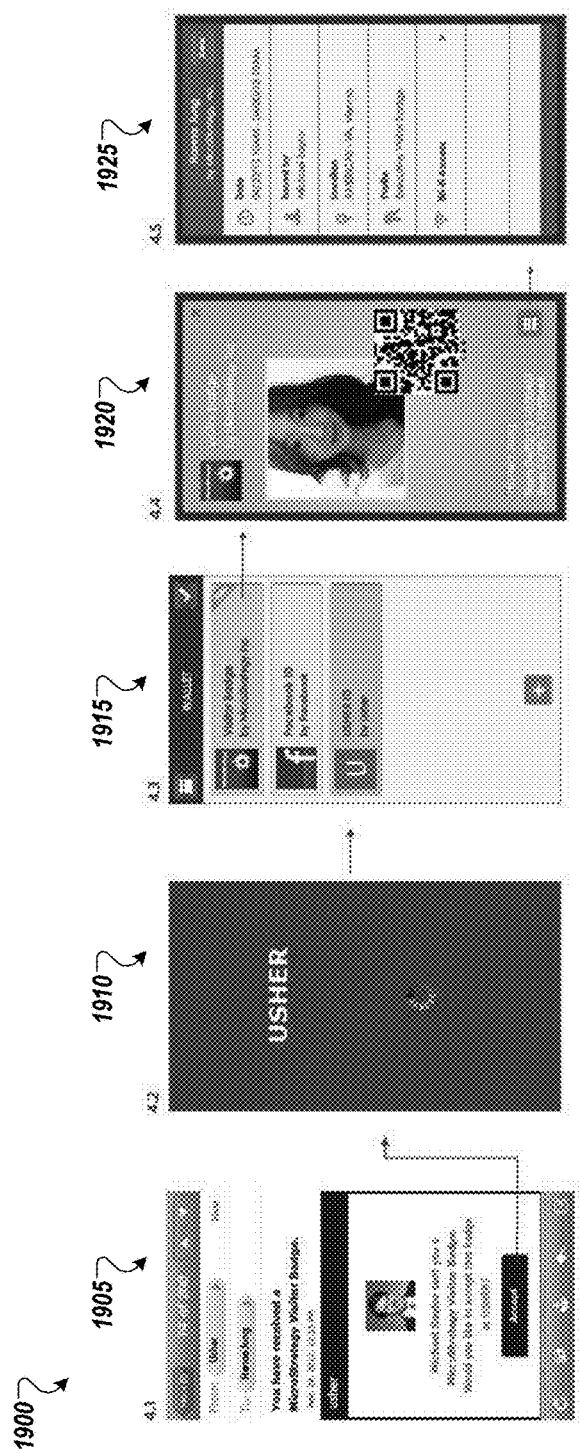
FIGS. 19-22 and 24 illustrate example sets of screen shots for receiving a visitor credential.

FIG. 19 illustrates an example set of screen shots 1900 for receiving a visitor credential. The set of screen shots 1900 illustrates the process for receiving a visitor credential when the visitor has installed the credential management application on the visitor's device and has an account with the credential management application.

Screen 1905 illustrates the visitor receiving an email indicating that the member has issued the visitor a visitor credential. The visitor accepts and because the visitor has the credential management application installed on the visitor's device and has an account with the credential management application, the visitor credential appears in the visitor's wallet in screen 1915. The visitor can select the visitor badge and view the visitor credential and the accessible resources in screens 1920 and 1925. The credential management application populates the visitor credential with data from the account with the credential management application. For example, the credential management application can use the visitor's picture from the user's account for the visitor credential.

Figure 20:

FIG. 20 illustrates an example set of screen shots for receiving a visitor credential. The set of screen shots 2000 illustrates the process for receiving a visitor credential when the visitor has not installed the credential management application on the visitor's device and has an account with the credential management application.

Screen 2005 illustrates the visitor receiving an email indicating that the member has issued the visitor a visitor credential. The visitor accepts and because the visitor does not have the credential management application installed on the visitor's device and has an account with the credential management application, credential management application prompts the visitor to download the credential management application software in screen 2010. The visitor installs the software and accesses the credential management application in screen 2015. The visitor creates an account with the credential management application in screen 2020. To complete the account verification, the credential management application verifies the visitor's email address. The credential management application prompts the visitor for a verification code to verify the visitor's email address in screen 2025. The visitor accesses the visitors email account in screen 2030 to retrieve the validation code and enters the code in screen 2040. The visitor credential appears in the visitor's wallet in screen 2045. The visitor can select the visitor badge and view the visitor credential and the accessible resources in screens 2050 and 2055. The credential management application populates the visitor credential with data from the account with the credential management application. For example, the credential management application can use the visitor's picture from the user's account for the visitor credential.

Figure 21:
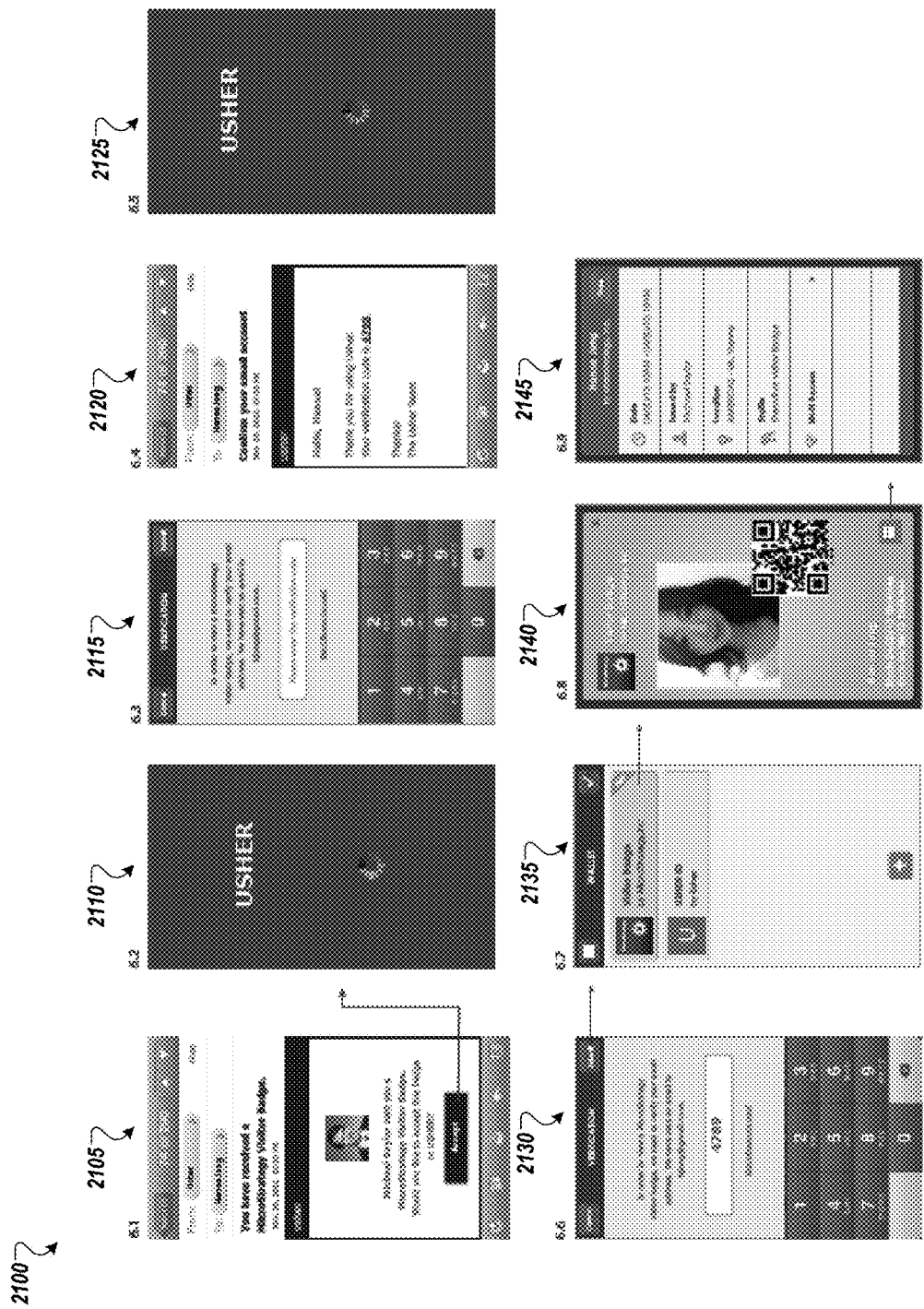

FIG. 21 illustrates an example set of screen shots for receiving a visitor credential. The set of screen shots 2100 illustrates the process for receiving a visitor credential when the visitor has installed the credential management application on the visitor's device and the email address entered by the credential holder requesting the visitor credential is not recognized by the credential management application.

Screen 2105 illustrates the visitor receiving an email indicating that the member has issued the visitor a visitor credential. The visitor accepts and because the visitor has the credential management application installed on the visitor's device but the credential management application does not recognize the email address, the credential management application prompts the visitor to verify the email address so that the credential management application can add the visitor credential to the visitor's list of credentials. The visitor verifies the visitor's address in screens 2115, 2120, and 2130. In screen 2135, the visitor views the visitor's wallet. The visitor can select the visitor credential to view the visitor credential and the accessible resources in screens 2140 and 2145. The credential management application populates the visitor credential with data from the account with the credential management application. For example, the credential management application can use the visitor's picture from the visitor's account for the visitor credential, if the visitor selected a picture during creation of the credential management application account. Alternatively, the credential management application may prompt the visitor for a photo for the visitor credential when the visitor views the visitor credential in screen 2140 or a photo may be provided by the credential granting authority.

Figure 22:
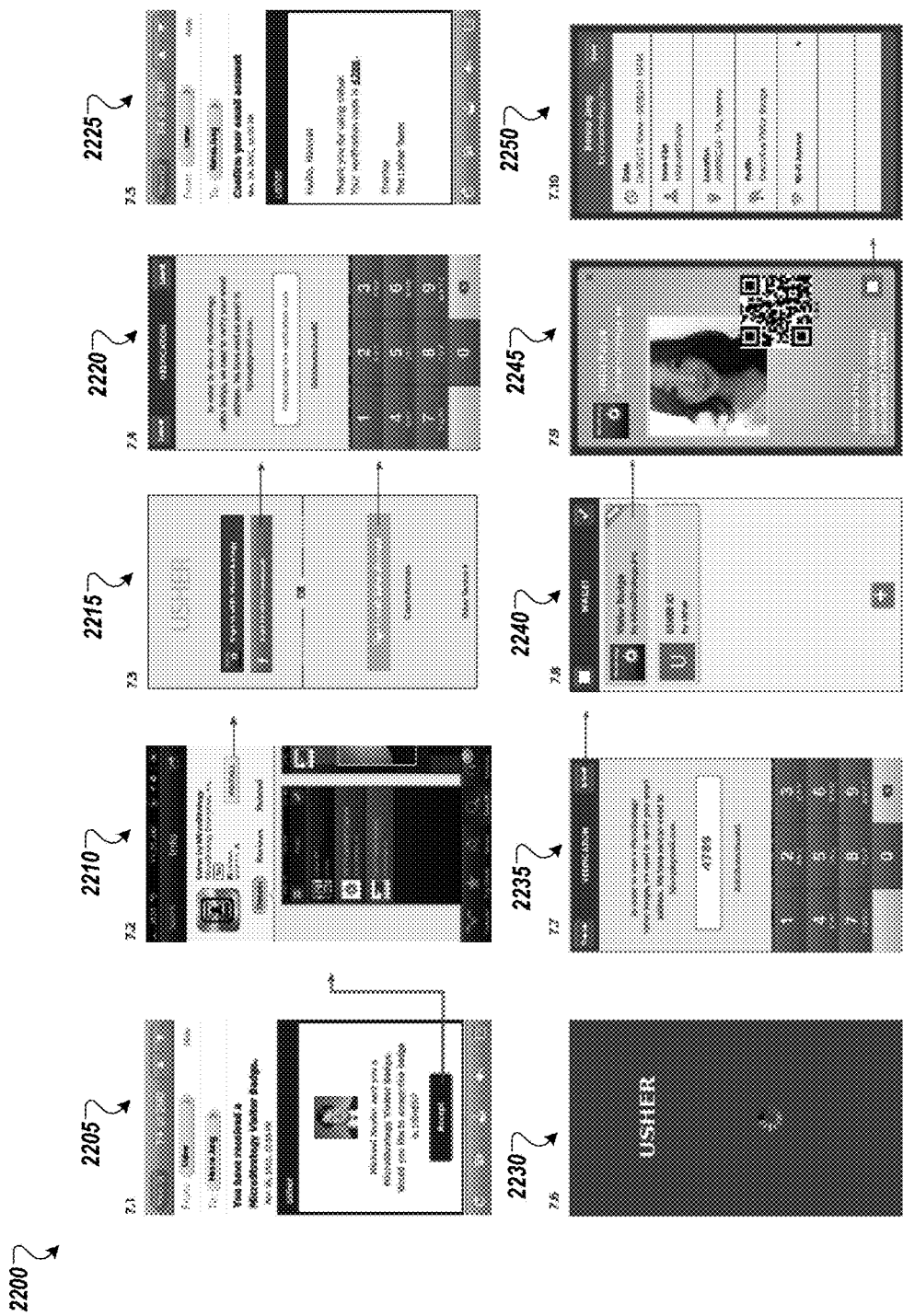

FIG. 22 illustrates an example set of screen shots for receiving a visitor credential. The set of screen shots 2200 illustrates the process for receiving a visitor credential when the visitor has not installed the credential management application on the visitor's device and the email address entered by the credential holder requesting the visitor credential is not recognized by the credential management application.

Screen 2205 illustrates the visitor receiving an email indicating that the member has issued the visitor a visitor credential. The visitor accepts and because the visitor does not have the credential management application installed on the visitor's device, the credential management application prompts the visitor to download the credential management application software in screen 2210. The visitor downloads the credential management application software and logs into the application in screen 2215. The email address where the visitor received the notification regarding the visitor credential was not recognized by the credential management application. The email received by the visitor contains a reference to the visitor credential and the reference is encoded. Selecting the link to the visitor credential in the email allows the credential management application to begin the process of adding the visitor credential to the visitors account. The credential management application requests a verification code in screen 2220. The visitor access the visitor's email in screen 2225 to retrieve the verification code and enters the code in screen 2235. Once verified, the visitor views the visitor's wallet in screen 2240 with the visitor credential added. The visitor can select the visitor credential to view the visitor credential and the accessible resources in screens 2245 and 2250. The credential management application populates the visitor credential with data from the account with the credential management application. For example, the credential management application can use the visitor's picture from the visitor's account for the visitor credential, if the visitor selected a picture during creation of the credential management application account. Alternatively, the credential management application may prompt the visitor for a photo for the visitor credential when the visitor views the visitor credential in screen 2245.

Figure 23:
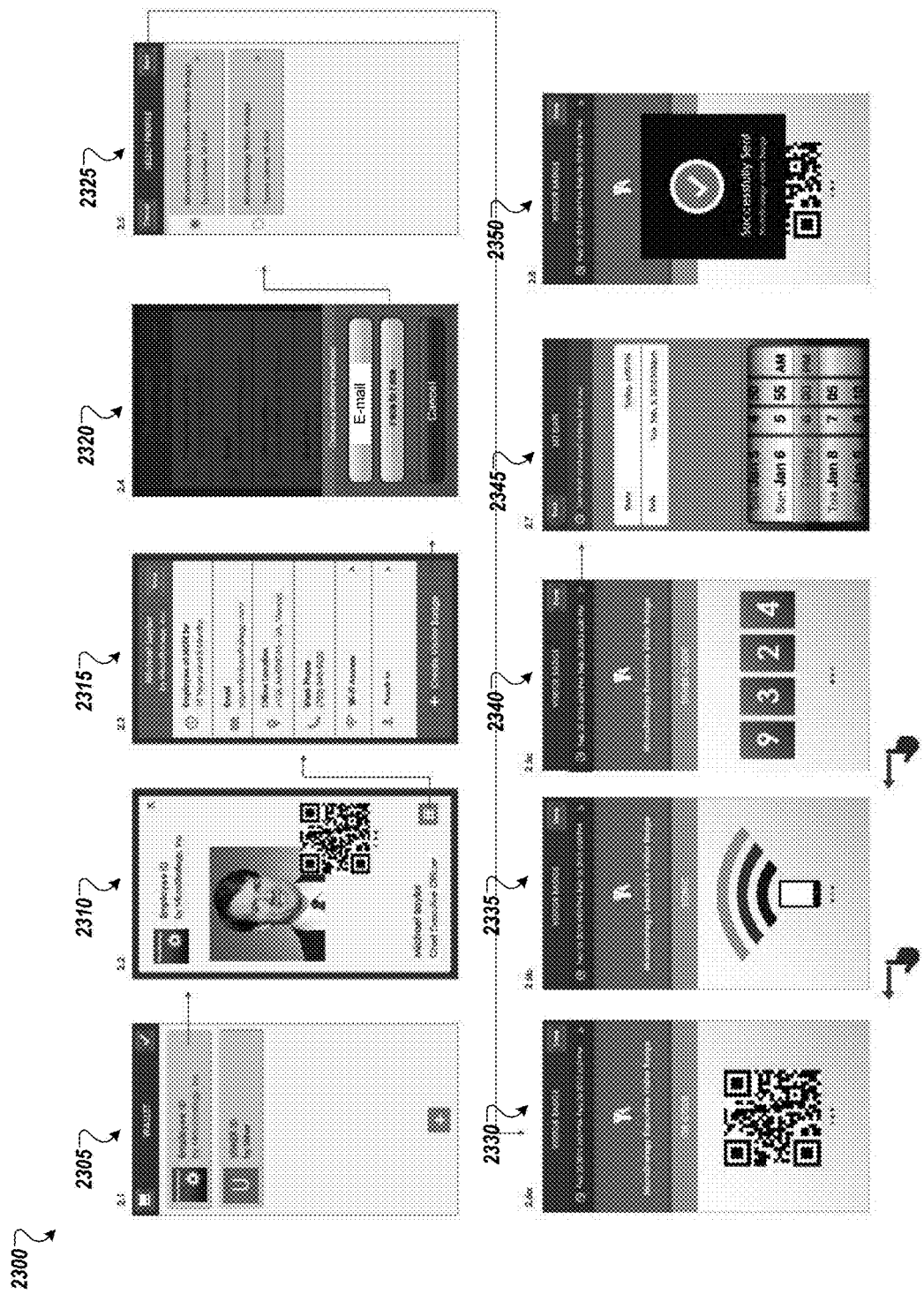

FIG. 23 illustrates an example set of screen shots 2300 for issuing a visitor credential. The set of screen shots 2300 illustrates the process for issuing a visitor credential through direct interaction with a visitor's device as performed on a client device such as a mobile phone.

The member issuing the visitor credential access the credential management application and views the member's wallet in screen 2305. The member selects the credential that is associated with the desired visitor credential. For example, if the member wants to issue a visitor credential for Organization 2, then the member selects the member's Organization 2credential. The member navigates to screen 2315 and selects the create visitor badge button. In screen 2320, the member selects to send the visitor credential to the visitor using face to face interaction. In screen 2330, the member selects one of the pre-defined visitor profiles. Screen 2330, 2335, and 2340 illustrate various methods to notify a visitor that he is receiving a visitor credential. Screen 2330 presents a QR code that the visitor can scan with the visitor's device to acquire the visitor badge. Screen 2335 presents an NFC option that enables NFC with the visitor's device to transfer visitor credential data. The NFC option may include convention NFC communication, Bluetooth, ultrasonic communication, and any other short range communication protocol. Screen 2340 presents a code that the visitor can enter into the credential management application to access the visitor credential. Any of the screens 2330, 2335, or 2340 show the screen of the member's device when the member's device is displaying or transmitting a reference to the visitor credential for receipt by the visitor's device. The reference may allow the visitor to access the visitor credential. The member may select start and end times in screen 2345. Once the member completes the request for the visitor credential, the confirmation screen 2350 appears on the member's device.

Figure 24:
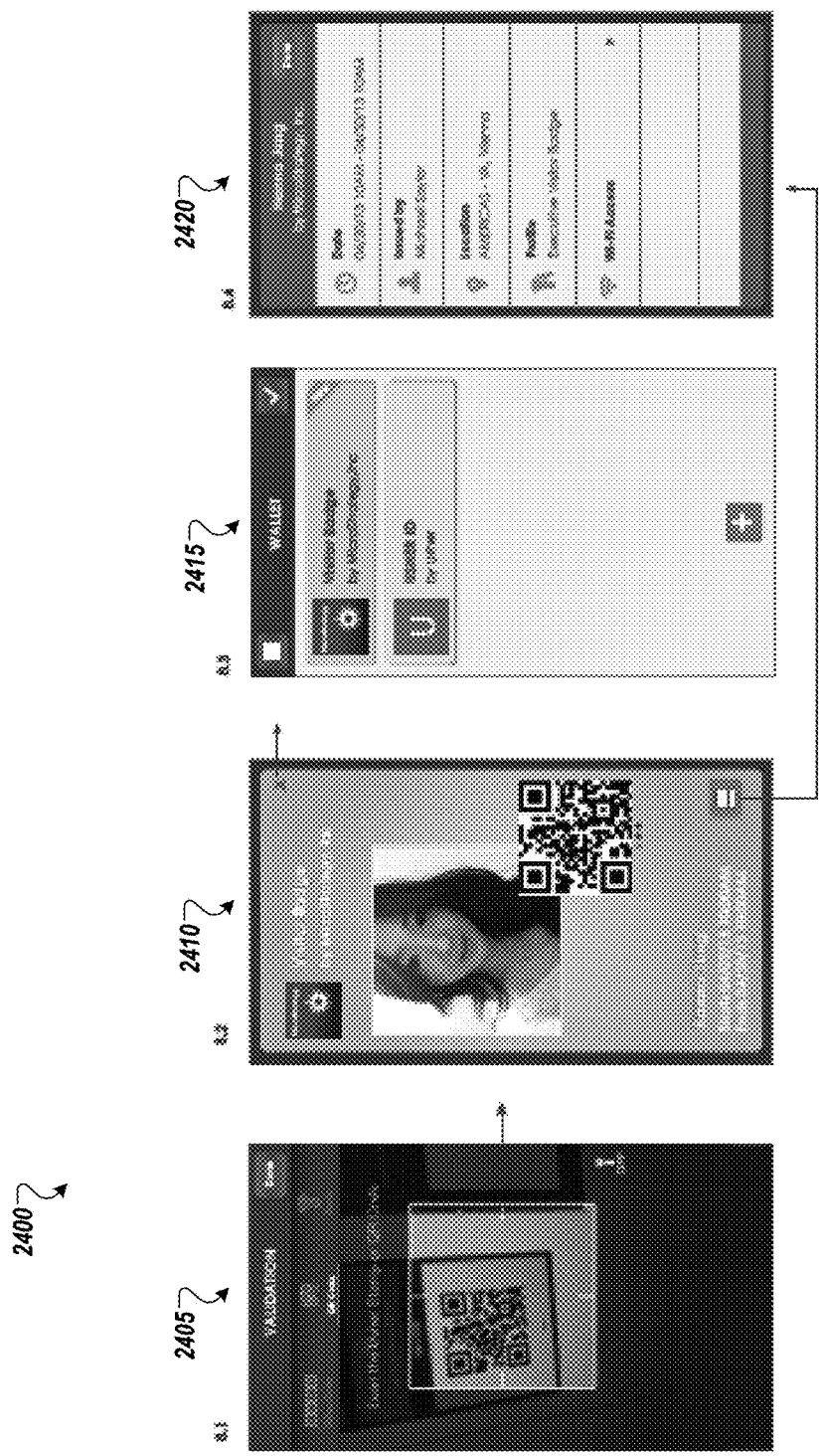

FIG. 24 illustrates an example set of screen shots for receiving a visitor credential. The set of screen shots 2400 illustrate the process for receiving a visitor credential through direct interaction between the visitor's device and the member's device.

Screen 2405 illustrates a QR code that the visitor may scan with the visitor's device. The QR code is encoded with a reference to the visitor credential. In order to scan the QR code, the visitor should be signed into the credential management application. When the visitor scans the QR code with the visitor's device, the credential management application decodes the reference to the visitor credential from the QR code and sends the reference to the visitor credential and an indication of the user who is signed into the credential management application to the server. The server then uses this information to determine that the visitor credential should be added to the user's account. Once the visitor credential is added to the visitor's account, then the visitor may view the visitor credential as shown in screen 2410. The visitor credential appears in the visitor's wallet in screen 2415 and the data associated with the visitor credential is shown in screen 2420. Instead of using a QR code, the reference to the visitor credential may be sent through NFC communication, Bluetooth, ultrasonic communication, or any other short range communication protocol.

Figure 25:
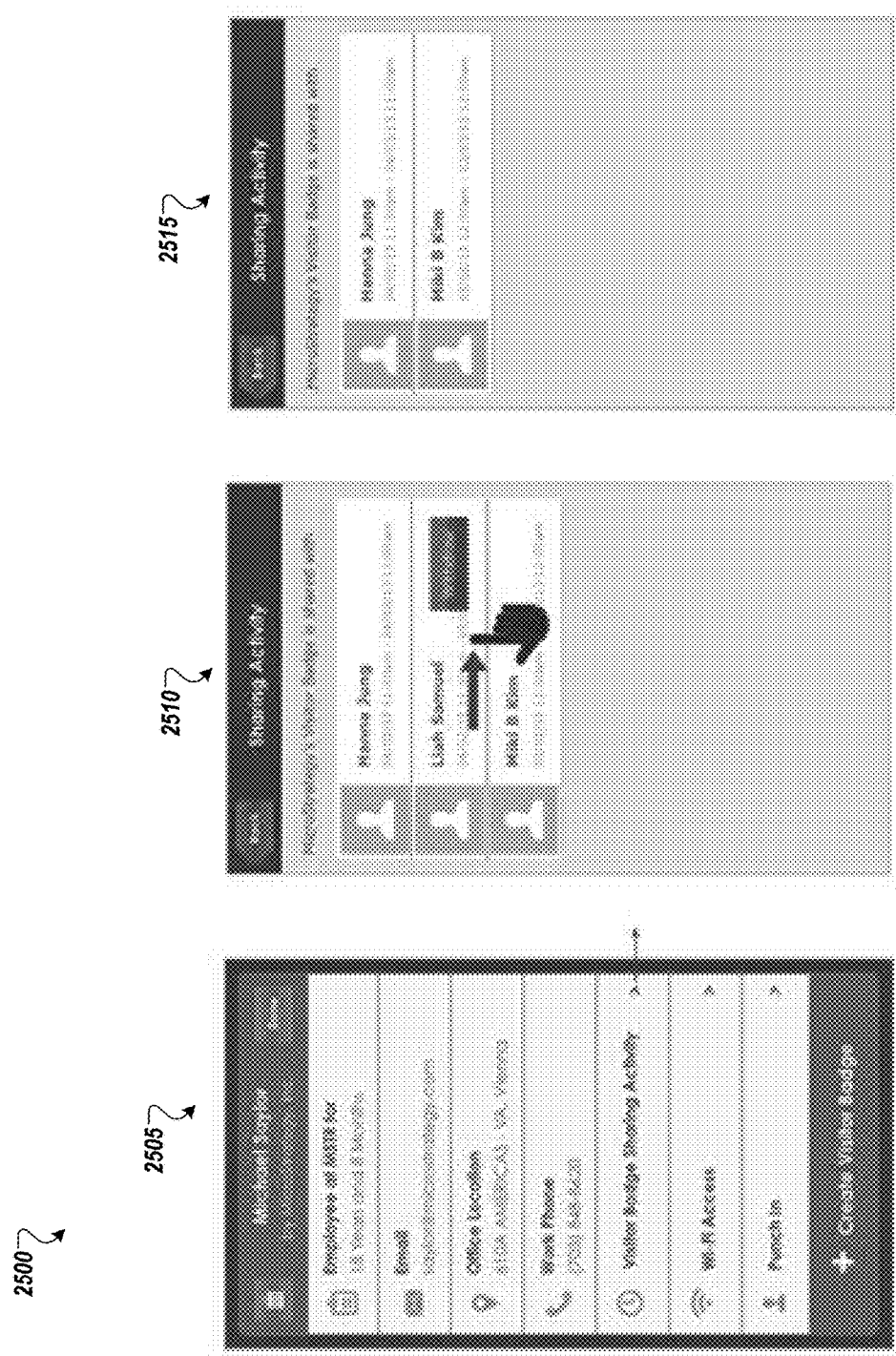
FIG. 25 illustrates an example set of screen shots for withdrawing a visitor credential.

FIG. 25 illustrates an example set of screen shots for withdrawing a visitor credential. The set of screen shots 2500 illustrate the process for a member who issued a visitor credential to withdraw the visitor credential. A visitor credential is withdrawn when the visitor credential is no longer accessible to the visitor. The visitor credential is typically withdrawn because the visitor credential expires. In some implementations, the visitor credential may be withdrawn because the member who requested the visitor credential chose to withdraw the visitor credential. The member may request to withdraw a visitor credential because the visitor may have engaged in inappropriate behavior such as trying to access a resource that the visitor was not authorized to access. When a visitor credential is withdrawn, the server may remove the visitor credential from the visitor data store. Alternatively, the server may mark the visitor credential as withdrawn. The server also removes the visitor credential from the visitor's account so that the visitor credential is not accessible through the credential management application. Alternatively, the credential management application may show the visitor credential as inaccessible, but may allow the visitor to communicate with the credential granting authority. The credential granting authority may reactivate the visitor credential.

The member may view the member's visitor badge activity by selecting visitor credential sharing activity in screen 2505. In screen 2510, the member can view the outstanding visitor credentials that the member has sponsored. The member may select a visitor credential to withdraw in 2510 and, once withdrawn, the visitor credential does not appear in the member's visitor's badge sharing activity screen as shown in screen 2515. The credential management application receives the withdrawal request from the member's device and withdraws the visitor credential from the credential management application.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. A computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at a server system, a request by a member of a credential granting authority to issue an electronic visitor credential to a visitor of the credential granting authority, the electronic visitor credential enabling access to one or more resources of the credential granting authority;

determining, by the server system, that the member of the credential granting authority is authorized to issue the electronic visitor credential to the visitor;

based on the determination that the member of the credential granting authority is authorized to issue the electronic visitor credential to the visitor, issuing, by the server system, the electronic visitor credential with at least one timing restriction that defines a time period during which the electronic visitor credential is valid and at least one usage restriction that limits resources of the credential granting authority to which the electronic visitor credential enables access, the issuing including:

storing, by the server system, visitor data for the electronic visitor credential that defines the at least one timing restriction and the at least one usage restriction, and sending, by the server system and to the visitor, data that enables usage of the electronic visitor credential;

requiring, from the member of a credential granting authority, data to renew the electronic visitor credential within a particular period of time from issuing the electronic visitor credential;

determining that the data to renew the electronic visitor credential was not received within the particular period of time;

based on determining that the data to renew the electronic credential was not received within the particular period of time, determining, by the server system, to withdraw the electronic visitor credential; and withdrawing, by the server system and based on determining to withdraw the electronic visitor credential, the electronic visitor credential.

2. The method of claim 1, wherein determining that the member of the credential granting authority is authorized to issue the electronic visitor credential to the visitor comprises:

determining that a timing restriction that defines a time period during which the member of the credential granting authority is authorized to issue the electronic visitor credential is satisfied.

3. The method of claim 1, wherein determining that the member of the credential granting authority is authorized to issue the electronic visitor credential to the visitor comprises:

determining that a geographic restriction that defines a geographic area where the member of the credential granting authority is authorized to issue the electronic visitor credential is satisfied.

4. The method of claim 1, wherein:

receiving the request comprises receiving a request that specifies:

visitor information descriptive of the visitor to receive the electronic visitor credential;

a start time that defines a time at which the electronic visitor credential becomes valid;

an expiration time that defines a time at which the electronic visitor credential expires; and an access level that defines the one or more resources of the credential granting authority to which the electronic visitor credential enables access;

issuing the electronic visitor credential comprises defining the at least one timing restriction based on the start time and the expiration time and defining the at least one usage restriction based on the access level; and sending the data that enables usage of the electronic visitor credential comprises sending, to the visitor, notification of the issuing the electronic visitor credential.

5. The method of claim 1, wherein sending data that enables usage of the electronic visitor credential comprises:

receiving an indication of direct interaction between the visitor and the member of the credential granting authority; and sending data that enables usage of the electronic visitor credential based on the indication of direct interaction between the visitor and the member of the credential granting authority.

6. The method of claim 5, wherein the direct interaction between the visitor and the member of the credential granting authority includes at least one of:

scanning, by a device of the visitor, a quick response code on a device of the member of the credential granting authority; and sending data through near field communication between the device of the visitor and the device of the member of the credential granting authority.

7. The method of claim 1, wherein sending data that enables usage of the electronic visitor credential comprises:

sending, by the server system and to an email address associated with the visitor, data for retrieving the electronic visitor credential.

8. The method of claim 1, wherein issuing the electronic visitor credential comprises:

determining, by accessing user account data of the server system, that the visitor has an account;

receiving an indication that a credential management application is installed on a device of the visitor;

issuing the electronic visitor credential based on data from the account; and adding the electronic visitor credential to a list of credentials held by the visitor.

9. The method of claim 1, wherein issuing the electronic visitor credential comprises:

determining, by accessing user account data of the server system, that the visitor has an account;

receiving an indication that a credential management application is not installed on the device of the visitor;

sending data to prompt the visitor to install software for the credential management application on the device of the visitor;

receiving data indicating that the software for the credential management application is installed on the device of the visitor;

based on receiving data indicating that the software for the credential management application is installed on the device of the visitor, issuing the electronic visitor credential further based on data from the account; and adding the electronic visitor credential to a list of credentials held by the visitor.

10. The method of claim 1, wherein issuing the electronic visitor credential comprises:

determining, by accessing user account data of the server system, that the visitor does not have an account;

receiving an indication that a credential management application is installed on a device of the visitor;

sending data to prompt the visitor to create an account with a credential management application;

issuing the electronic visitor credential further based on data from the account; and adding the electronic visitor credential to a list of credentials held by the visitor.

11. The method of claim 1, wherein issuing the electronic visitor credential comprises:
  determining, by accessing user account data of the server system, that the visitor does not have an account;
  receiving an indication that a credential management application is not installed on a device of the visitor;
  sending data to prompt the visitor to install software for the credential management application on the device of the visitor;
  receiving data indicating that the software for the credential management application is installed on the device of the visitor;
  based on receiving data indicating that the software for the credential management application is installed on the device of the visitor, sending data to prompt the visitor to create the account;
  receiving data indicating that the visitor created the account;
  issuing the electronic visitor credential further based on data from the account; and
  adding the electronic visitor credential to a list of credentials held by the visitor.

12. The method of claim 1, wherein sending data that enables usage of the electronic visitor credential comprises sending an address that links to the electronic visitor credential.

13. The method of claim 1, wherein issuing the electronic visitor credential comprises:
  including, in the electronic visitor credential, information stored in connection with a visitor's account, wherein the information stored in connection with the visitor's account comprises a photo of the visitor and an employer of the visitor.

14. The method of claim 1, further comprising:
  receiving data indicating attempted use of the withdrawn electronic visitor credential; and
  sending, for display on a device of the visitor, data indicating that the electronic visitor credential is withdrawn.

15. The method of claim 1, wherein:
  determining, by the server system, to withdraw the electronic visitor credential comprises determining that the visitor has engaged in inappropriate usage of the electronic visitor credential; and
  withdrawing the electronic visitor credential comprises based on determining that the visitor has engaged in inappropriate usage of the electronic visitor credential, withdrawing the electronic visitor credential.

16. The method of claim 1, wherein:
  determining, by the server system, to withdraw the electronic visitor credential comprises receiving, by the server system and from the member of the credential granting authority, a request to withdraw the electronic visitor credential; and
  withdrawing the electronic visitor credential comprises withdrawing the electronic visitor credential based on the received request to withdraw the electronic visitor credential.

17. The method of claim 1, wherein:
  determining, by the server system, to withdraw the electronic visitor credential comprises determining that the electronic visitor credential has expired based on the at least one timing restriction; and
  withdrawing the electronic visitor credential comprises withdrawing the electronic visitor credential based on the determination that the electronic visitor credential has expired.

18. The method of claim 1, wherein determining that the member of the credential granting authority is authorized to issue the electronic visitor credential to the visitor comprises:
  accessing user account data for the member of the credential granting authority; and
  based on accessing the user account data for the member of the credential granting authority, determining that the member of the credential granting authority is authorized to issue the electronic visitor credential.

19. A system comprising:
  one or more computers and one or more storage devices storing instructions that are operable, when executed by the one or more computers, to cause the one or more computers to perform operations comprising:
    receiving a request by a member of a credential granting authority to issue an electronic visitor credential to a visitor of the credential granting authority, the electronic visitor credential enabling access to one or more resources of the credential granting authority;
    determining that the member of the credential granting authority is authorized to issue the electronic visitor credential to the visitor;
    based on the determination that the member of the credential granting authority is authorized to issue the electronic visitor credential to the visitor, issuing the electronic visitor credential with at least one timing restriction that defines a time period during which the electronic visitor credential is valid and at least one usage restriction that limits resources of the credential granting authority to which the electronic visitor credential enables access, the issuing including:
      storing visitor data for the electronic visitor credential that defines the at least one timing restriction and the at least one usage restriction;
      identifying user account data stored in association with a visitor's account;
      associating user account data stored in association with a visitor's account with the electronic visitor credential; and
      sending to the visitor, data that enables usage of the electronic visitor credential;
    requiring, from the member of a credential granting authority, data to renew the electronic visitor credential within a particular period of time from issuing the electronic visitor credential;
    determining that the data to renew the electronic visitor credential was not received within the particular period of time;
    based on determining that the data to renew the electronic credential was not received within the particular period of time, determining to withdraw the electronic visitor credential; and
    withdrawing based on determining to withdraw the electronic visitor credential, the electronic visitor credential.

20. A non-transitory computer-readable medium storing software comprising instructions executable by one or more computers which, upon such execution, cause the one or more computers to perform operations comprising:
  receiving a request by a member of a credential granting authority to issue an electronic visitor credential to a visitor of the credential granting authority, the electronic visitor credential enabling access to one or more resources of the credential granting authority;

determining that the member of the credential granting authority is authorized to issue the electronic visitor credential to the visitor;

based on the determination that the member of the credential granting authority is authorized to issue the electronic visitor credential to the visitor, issuing the electronic visitor credential with at least one timing restriction that defines a time period during which the electronic visitor credential is valid and at least one usage restriction that limits resources of the credential granting authority to which the electronic visitor credential enables access, the issuing including:

storing visitor data for the electronic visitor credential that defines the at least one timing restriction and the at least one usage restriction, and sending to the visitor, data that enables usage of the electronic visitor credential;

requiring, from the member of a credential granting authority, data to renew the electronic visitor credential within a particular period of time from issuing the electronic visitor credential;

determining that the data to renew the electronic visitor credential was not received within the particular period of time;

based on determining that the data to renew the electronic credential was not received within the particular period of time, determining to withdraw the electronic visitor credential; and withdrawing, based on determining to withdraw the electronic visitor credential, the electronic visitor credential.

21. The medium of claim 20, wherein the operations further comprise:

receiving data indicating that the visitor is attempting to access one of the one or more resources of the credential granting authority;

determining that the electronic visitor credential grants access to the one of the one or more resources; and sending data to allow the visitor to access the one of the one or more resources.

22. The medium of claim 20, wherein receiving the request comprises:

receiving a request from a visitor for the electronic visitor credential; and sending data to the member of the credential granting authority to request the electronic visitor credential.

23. The medium of claim 20, wherein receiving the request comprises:

receiving data indicating that the visitor has attempted to access one of the one or more resources of the credential granting authority; and sending data to the member of the credential granting authority to request the electronic visitor credential.

* * * * *

UNITED STATES PATENT AND TRADEMARK OFFICE
CERTIFICATE OF CORRECTION

PATENT NO. : 9,990,786 B1
APPLICATION NO. : 14/598482
DATED : June 5, 2018
INVENTOR(S) : Siamak Ziraknejad Page 1 of 1

It is certified that error appears in the above-identified patent and that said Letters Patent is hereby corrected as shown below:

On the Title Page

Column 2, ABSTRACT (57), Line 14, delete "access" and insert -- access. --, therefor.

In the Claims

In Claim 19, Column 30, Line 56, delete "withdrawing" and insert -- withdrawing, --, therefor.

In Claim 20, Column 31, Line 15 (approx.), delete "sending" and insert -- sending, --, therefor.

Signed and Sealed this
Fourteenth Day of August, 2018

Andrei Iancu
*Director of the United States Patent and Trademark Office*

UNITED STATES PATENT AND TRADEMARK OFFICE
CERTIFICATE OF CORRECTION

PATENT NO. : 9,990,786 B1
APPLICATION NO. : 14/598482
DATED : June 5, 2018
INVENTOR(S) : Ziraknejad Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this
Thirteenth Day of August, 2019

Andrei Iancu
*Director of the United States Patent and Trademark Office*